(12) United States Patent
Wiesner et al.

(10) Patent No.: US 9,714,173 B2
(45) Date of Patent: Jul. 25, 2017

(54) GYROIDAL MESOPOROUS CARBON MATERIALS AND METHODS THEREOF

(71) Applicant: CORNELL UNIVERSITY, Ithaca, NY (US)

(72) Inventors: Ulrich B. Wiesner, Ithaca, NY (US); Joerg G. Werner, Ithaca, NY (US)

(73) Assignee: CORNELL UNIVERSITY, Ithaca, NY (US)

( * ) Notice: Subject to any disclaimer, the term of this patent is extended or adjusted under 35 U.S.C. 154(b) by 0 days.

(21) Appl. No.: 14/456,396

(22) Filed: Aug. 11, 2014

(65) Prior Publication Data

US 2015/0041708 A1 Feb. 12, 2015

Related U.S. Application Data

(60) Provisional application No. 61/863,981, filed on Aug. 9, 2013.

(51) Int. Cl.
| | | |
|---|---|---|
| *C01B 31/08* | (2006.01) | |
| *C01B 31/00* | (2006.01) | |
| *C01B 31/10* | (2006.01) | |
| *H01G 11/24* | (2013.01) | |
| *H01M 4/583* | (2010.01) | |
| *H01G 11/34* | (2013.01) | |

(Continued)

(52) U.S. Cl.
CPC ............ *C01B 31/089* (2013.01); *C01B 31/00* (2013.01); *C01B 31/08* (2013.01); *C01B 31/10* (2013.01); *H01G 11/24* (2013.01); *H01G 11/34* (2013.01); *H01M 4/583* (2013.01); *C02F 1/4691* (2013.01); *C02F 2001/46133* (2013.01); *Y02E 60/13* (2013.01)

(58) Field of Classification Search
CPC ....... C01B 31/089; C01B 31/08; H01G 11/34; H01M 4/583; C02F 2001/46133; C02F 1/4691
See application file for complete search history.

(56) References Cited

U.S. PATENT DOCUMENTS

| | | |
|---|---|---|
| 6,433,931 B1 | 8/2002 | Fink et al. |
| 6,565,763 B1 * | 5/2003 | Asakawa ............... B82Y 10/00 216/22 |
| 7,056,455 B2 | 6/2006 | Matyjaszewski et al. |

(Continued)

FOREIGN PATENT DOCUMENTS

| | | |
|---|---|---|
| KR | 1020070024435 A | 3/2007 |
| WO | 2013/123137 A1 | 8/2013 |

OTHER PUBLICATIONS

Li et al. Macromolecules 2011, 44, 9295-9309.*

(Continued)

*Primary Examiner* — Peter F Godenschwager
*Assistant Examiner* — Andrew J Oyer
(74) *Attorney, Agent, or Firm* — Heslin Rothenberg Farley & Mesiti P.C.

(57) ABSTRACT

The present invention relates to, inter alia, gyroidal mesoporous carbon materials and methods of use and manufacture thereof. In one embodiment, the present invention relates to a mesoporous carbon composition comprising a gyroidal mesoporous carbon having an ordered gyroidal structure and mesopores having a pore size of greater than 2 nanometers (nm) in diameter, and more particularly greater than 11 nm in diameter.

33 Claims, 19 Drawing Sheets

(51) Int. Cl.
    *C02F 1/469*     (2006.01)
    *C02F 1/461*     (2006.01)

(56) References Cited

U.S. PATENT DOCUMENTS

| | | |
|---|---|---|
| 8,080,483 B2 | 12/2011 | Hillhouse et al. |
| 8,563,124 B2 | 10/2013 | Chmelka et al. |
| 2006/0057051 A1* | 3/2006 | Dai .................. C01B 31/02 423/445 R |
| 2010/0040861 A1 | 2/2010 | Addiego et al. |
| 2012/0213986 A1* | 8/2012 | Kowalewski et al. ..... 428/304.4 |

OTHER PUBLICATIONS

Hu et al. Advanced Functional Materials, 2007, 17, 1873-1878.*
Ding et al. Electrochemica Acta 2005, 50, 3131-3141.*
Wang et al. Chem. Mater. 2008, 20, 7195-7200.*
Hsueh et al. Adv. Mater. 2011, 23, 3041-3046.*
You et al. Talanta 2011, 83, 1507-1514.*
Jorg Werner et al. "Synthesis and Characterization of Gyroidal Mesoporous Carbons and Carbon Monoliths with Tunable Ultralarge Pore Size" ACS Nano 2014 vol. 8, No. 1, p. 731-743.*
Werner et al., "Synthesis and Characterization of Gyroidal Mesoporous Carbons and Carbon Monoliths with Tunable Ultralarge Pore Size," *ACS Nano*, 8(1):731-743 (2014).

* cited by examiner

US 9,714,173 B2

GYROIDAL MESOPOROUS CARBON MATERIALS AND METHODS THEREOF

CROSS-REFERENCE TO RELATED APPLICATIONS

This application claims priority benefit of U.S. Provisional Patent Application Ser. No. 61/863,981, filed Aug. 9, 2013, the disclosure of which is hereby incorporated by reference herein in its entirety.

GOVERNMENT RIGHTS STATEMENT

This invention was made with Government support under grant number DE-SC0001086 awarded by the United States Department of Energy. The Government has certain rights in the invention.

FIELD OF THE INVENTION

This invention relates to, inter alia, gyroidal mesoporous carbon materials and methods of use and manufacture thereof.

BACKGROUND OF THE INVENTION

Chemical and physical properties like good electrical and thermal conductivity, chemical resistance and inertness as well as low density combined with high surface area and porosity make porous carbon materials a preferred material in a broad field of applications, such as electrodes in batteries and fuel cells, and gas adsorbents.[1-3]

Ordered mesoporous carbons (OMC) have retained a lot of attention since their first synthesis in 1999, where silica templates were used as a mold.[4,5] This hard-templating method is very versatile and dimensions are only limited by the availability of the silica template, but it is tedious due to multiple step synthesis and the removal of the silica template with hazardous chemicals.[6-12]

The first soft-templated OMC used structure direction from the block copolymer poly(styrene)-block-poly(4-vinylpyridine) (PS-b-P4VP) with resorcinol through solvent evaporation induced self-assembly (EISA) and subsequent gas-solid reaction with gaseous formaldehyde (Liang et al., 2004). The resulting carbon thin films of up to 1 μm thickness showed hexagonally ordered cylindrical pores with a pore size of 33.7 nm after pyrolysis.

Since this first report, extensive studies on soft-templated OMCs have been performed using the surfactant-like block copolymers Pluronics®. Due to the small molar mass of these structure directing molecules, however, the accessible pore size range was limited to less than 4 nm, which was increased to 15-16 nm by molecular swelling agents, as well as by using carbon onions or carbon black additives.[14-17] Only a few reports on the use of block copolymers with molar masses up to 45.6 kDa for the synthesis of OMCs with larger pore sizes were published.[18-21]

Pore sizes up to 37 nm have been achieved using poly(styrene)-block-poly(ethylene oxide) (PS-PEO) with poly(styrene) homopolymer addition as pore expander and phenolic resols as the carbon precursors.[23] The mesostructures achieved with these polymers were inverse micellar and hexagonally packed cylinders. Ordered, bicontinuous networks, such as gyroidal mesoporous carbons, have only been reported using Pluronics®, and recently using the structure directing block copolymer poly(ethylene oxide)-block-poly(ε-caprolactone) (PEO-b-PCL).[15,22] However, the reported material showed only a small pore size of 11 nm and low porosity.

The present invention is directed to overcoming these and other deficiencies in the art.

SUMMARY OF THE INVENTION

The present invention relates to, inter alia, gyroidal mesoporous carbon materials and methods of use and manufacture thereof.

In one aspect, the present invention relates to a mesoporous carbon composition comprising a gyroidal mesoporous carbon. The gyroidal mesoporous carbon comprises an ordered gyroidal structure and mesopores having a pore size of greater than 2 nanometers (nm) in diameter, and more particularly greater than 11 nm in diameter.

In one embodiment, the gyroidal mesoporous carbon further comprises nanopores to provide increased surface area.

In another embodiment, the gyroidal mesoporous carbon composition further comprises a dopant or a nanoparticulate.

In one aspect, the present invention relates to an electrode material comprising a mesoporous carbon composition as described herein. In various embodiments, the electrode material is used in fuel cells, batteries, supercapacitors, capacitive desalination membranes, energy storage devices, energy conversion devices, and the like.

In one aspect, the present invention relates to a method of making a mesoporous carbon composition comprising a gyroidal mesoporous carbon. This method involves the steps of: (i) combining a carbon precursor and a structure-directing triblock terpolymer to yield a self-assembled precursor/terpolymer composite having an ordered gyroidal structure that is defined by the triblock terpolymer and the ratio of the triblock terpolymer to the carbon precursor; and (ii) treating the precursor/terpolymer composite to remove the triblock terpolymer, thereby yielding a gyroidal mesoporous carbon comprising an ordered gyroidal structure and mesopores having a pore size of greater than 11 nanometers (nm) in diameter.

In one embodiment, prior to the treating step, the method further comprises inducing crosslinking of the carbon precursor contained in the molded component.

In one embodiment, the method further comprises subjecting the gyroidal mesoporous carbon to an activation process to form nanopores on and/or within the gyroidal mesoporous carbon to increase surface area thereof.

In one embodiment, the method further comprises adding a dopant and/or a nanoparticulate precursor during the combining step.

In another aspect, the present invention relates to a gyroidal mesoporous carbon composition produced according to the method described herein.

In another aspect, the present invention relates to an electrode material comprising the gyroidal mesoporous carbon composition made according to the method described herein.

In another aspect, the present invention relates to an organic-organic hybrid composition comprising a structure-directing triblock terpolymer and a carbon precursor combined to form a self-assembled precursor/terpolymer composite having an ordered gyroidal structure that is defined by the triblock terpolymer and the ratio of the triblock terpolymer to the carbon precursor.

In one aspect, the present invention provides for the tunable and reproducible synthesis of gyroidal mesoporous carbon morphologies through the evaporation induced self-assembly (EISA) process of the structure directing triblock terpolymer poly(isoprene)-block-poly(styrene)-block-poly(ethylene oxide) (ISO) with phenol- or resorcinol-formaldehyde resols as carbon precursors. The tunability of the material characteristics such as porosity and mesostructure by rational design of the soft template is set forth herein. As provided herein, organic-organic hybrids with the core-shell double gyroid and hybrids with the alternating gyroid morphology result in a double gyroidal carbon matrix and a single gyroidal carbon network, respectively, after successful carbonization. The pore size tunability is demonstrated by using three ISOs with similar composition but different molar mass. The bicontinuous, ordered carbon materials show surprisingly good structure retention after heat treatment at temperatures of at least 1600° C. This high temperature stability allows for thermal tunability of the microstructure of the carbon as well as the microporosity.

These and other objects, features, and advantages of this invention will become apparent from the following detailed description of the various aspects of the invention taken in conjunction with the accompanying drawings.

BRIEF DESCRIPTION OF THE DRAWINGS

For the purpose of illustrating aspects of the present invention, there are depicted in the drawings certain embodiments of the invention. However, the invention is not limited to the precise arrangements and instrumentalities of the embodiments depicted in the drawings. Further, as provided, like reference numerals contained in the drawings are meant to identify similar or identical elements.

FIG. 1A is a schematic of one embodiment of an organic-organic hybrid composition of the present invention. The organic-organic hybrid composition shown in FIG. 1A has an ordered core-shell double gyroidal structure. FIG. 1B is a schematic of one embodiment of a gyroidal mesoporous carbon of the present invention. The gyroidal mesoporous composition shown in FIG. 1B is a double gyroidal mesoporous carbon that results from pyrolyzing the organic-organic hybrid composition of FIG. 1A. FIG. 1C is a schematic of one embodiment of a double gyroidal mesoporous carbon combined with nanoparticulates.

FIG. 2A is a schematic of one embodiment of an organic-organic hybrid composition of the present invention. The organic-organic hybrid composition shown in FIG. 2A has an ordered alternating gyroidal structure. FIG. 2B is a schematic of one embodiment of a gyroidal mesoporous carbon of the present invention. The gyroidal mesoporous composition shown in FIG. 2B is a single gyroidal mesoporous carbon that results from pyrolyzing the organic-organic hybrid composition of FIG. 2A.

Figure 1A:
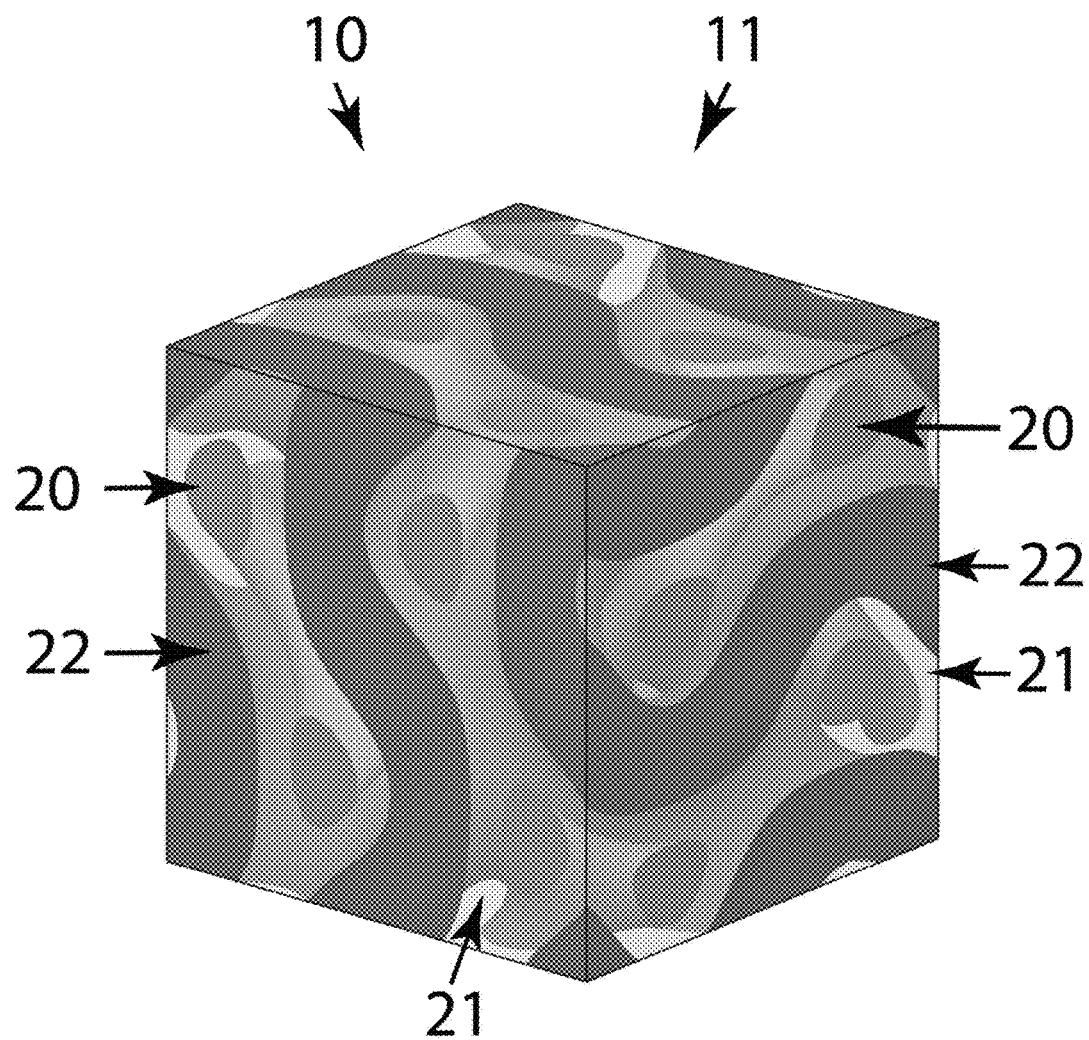
FIGS. 1A-1C.

(C) Nitrogen sorption isotherms and (D) BJH pore size distributions of $G^DMC\#1$-15-900, $G^DMC\#2$-20-900, $G^DMC\#3$-39-900.

FIGS. 12A-12B: (A) Scanning electron microscopy image and (B) transmission electron microscopy image of $G^DMC\#1$-15-1600 at low magnification showing a high degree of long range order and associated large gyroidal grain size of this carbon material.

FIGS. 13A-13B: (A) Scanning electron microscopy image of a 900° C. pyrolyzed hybrid material of ISO#5 and phenol/formaldehyde resols suggesting the formation of a disordered network. (B) Small angle X-ray scattering patterns of the hybrid before pyrolysis (lower trace) and after pyrolysis (upper trace) revealing poor structure formation in the hybrid and loss of periodicity after heat treatment. The material was prepared the same way as the GDMCs.

FIGS. 14A-14B: (A) Powder X-ray diffraction patters of $G^DMC\#2$-20-900 (lower trace) and $G^DMC\#2$-20-1600 (upper trace) showing the evolution of the graphitic (200) reflex at 22-26° and the (100) and (101) reflexes at 42-46°. The broad peaks indicate the existence of small graphitic clusters in the material. (B) Representative Raman spectra of powdered gyroidal mesoporous carbons heated at 900° C. (top, open squares, derived from ISO#2) and 1600° C. (bottom, open circles, derived from ISO#1) with peaks from peak fitting for the D and the G bands.

FIGS. 15A-15D: (A) Scanning electron microscopy image and small angle X-ray scattering (inset) pattern of ISO#1-Hex-1600 suggesting the formation of hexagonally oriented porous cylinders in a carbon matrix. The tick marks in the scattering pattern indicate the expected peak positions for hexagonal ordered cylinders. (B) Nitrogen sorption isotherms and BJH pore size distributions (inset) of ISO#1-Hex-1600 (solid line) and ISO#2-Hex-1600 (dashed line). (C) The Raman spectrum of ISO#1-Hex-1600 is similar to the spectra of the gyroidal mesoporous carbons pyrolyzed at 1600° C. (D) High resolution—transmission electron microscopy image of ISO#2-Hex-1600 revealing the existence of small, bent graphitic clusters of a few stacked sheets with a length of 3-7 nm. Inset at a lower magnification of the same sample shows the mesostructure.

FIGS. 16A-16D: (A) Nitrogen sorption isotherms, (B) BJH pore size distributions and (C) SAXS patterns of $G^DMC$-15-1600 before (black) and after $CO_2$-activation for 6 hours (red) and 10 hours (blue). The SAXS patterns of the activated carbons were taken from powders, which generally leads to broader and less defined peaks. (D) TEM image of $G^DMC$-15-1600 after $CO_2$-activation for 10 hours exhibiting the roughening of the carbon walls (inset at lower magnification shows the preservation of the periodic lattice).

FIGS. 17A-17D: (A) SEM image of boron doped B-$G^DMC$-15-900 showing the well ordered double gyroidal morphology. (B) HR-XPS spectra of undoped $G^DMC$-15-900 (black), as well as boron doped B-$G^DMC$-15 pyrolized at 600° C. (red) and 900° C. (blue). The spectra are shifted vertically for clarity. (C) TEM image of Pt-$G^DMC$-20-900 showing well dispersed nanoparticles in the double gyroidal carbon structure. (D) XRD spectra of Pt-$G^DMC$-20-900. Droplines indicate the expected positions and intensity ratio for platinum (ICDD pdf-card 01-087-0640).

DETAILED DESCRIPTION OF THE INVENTION

The present invention relates to, inter alia, gyroidal mesoporous carbon materials and methods of the use and manufacture thereof.

One advantage of the technology of the present invention is that it provides for the tunable and reproducible synthesis of particular gyroidal mesoporous carbon morphologies through the use of a soft-template technique. In one approach of the present disclosure, the tunability of various characteristics such as porosity and mesostructure is achieved by rational design of the soft template. For example, as provided herein, tunability of the porosity, pore volume, mesostructure, and thermal stability of the gyroidal mesoporous carbons of the present invention can be achieved using a soft-template system that involves custom-designed organic-organic hybrid compositions.

Organic-Organic Hybrid Compositions

In one aspect, the present invention provides organic-organic hybrid compositions that are suitable for various uses. In accordance with one particular use, the organic-organic hybrid compositions can be pyrolyzed to form gyroidal mesoporous carbons of a described porosity, pore volume, mesostructure, and thermal stability.

In one embodiment, the organic-organic hybrid composition of the present invention comprises a structure-directing triblock terpolymer and a carbon precursor combined to form a self-assembled precursor/terpolymer composite having an ordered gyroidal structure that is defined by the triblock terpolymer and the ratio of the triblock terpolymer to the carbon precursor.

As used herein, the term "triblock terpolymer" generally refers to a triblock terpolymer having two hydrophobic or non-hydrophilic blocks and an hydrophilic endblock, and more particularly to a non-frustrated triblock terpolymer having two hydrophobic or non-hydrophilic blocks and an hydrophilic endblock. For example, a triblock terpolymer of the present invention would have three block phases, as follows: a first hydrophobic phase, a second hydrophobic phase, and an hydrophilic phase. The hydrophilic phase is always an end polymer of the triblock terpolymer. For example, a generic structure of the triblock terpolymer would be as follows: Hydrophobic Polymer A-block-Hydrophobic Polymer B-block-Hydrophilic Polymer C.

Suitable examples of triblock terpolymers in accordance with the present invention can include, without limitation, the following:

poly(isoprene)-block-poly(styrene)-block-poly(ethylene oxide), poly(isoprene)-block-poly(styrene)-block-poly(4-vinyl pyridine), poly(isoprene)-block-poly(styrene)-block-poly(2-vinyl pyridine), poly(isoprene)-block-poly(styrene)-block-poly(glycidyl methacrylate), poly(isoprene)-block-poly(styrene)-block-poly(dimethyl amino ethyl methacrylate), poly(isoprene)-block-poly(styrene)-block-poly(methacrylic acid), poly(butadiene)-block-poly(styrene)-block-poly(ethylene oxide), poly(butadiene)-block-poly(styrene)-block-poly(4-vinyl pyridine), poly(butadiene)-block-poly(styrene)-block-poly(2-vinyl pyridine), poly(butadiene)-block-poly(styrene)-block-poly(glycidyl methacrylate), poly(butadiene)-block-poly(styrene)-block-poly(dimethyl amino ethyl methacrylate), poly(butadiene)-block-poly(styrene)-block-poly(methacrylic acid),
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(isoprene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X,
poly(butadiene)-block-poly(styrene)-block-Polymer X, and the like,
where "Polymer X" is any other suitable hydrophilic third block polymer.

As mentioned above, in addition to a structure-directing triblock terpolymer, the organic-organic hybrid composition of the present invention also includes a carbon precursor. As used herein, the term "carbon precursor" refers to an organic molecule or compound that is hydrophilic and that can combine with the hydrophilic polymer block of the triblock terpolymer. A suitable example of a carbon precursor in accordance with the present invention includes, without limitation, a thermally cross-linkable organic molecule. Examples of suitable thermally cross-linkable organic molecules can include, without limitation, resins, oligomeric resins, aromatic alcohols, unsaturated alcohols, phenol based resols, phenol-formaldehyde resols, resorcinol-formaldehyde resols, furfuryl alcohol, and mixtures thereof.

The self-assembled precursor/terpolymer composite of the organic-organic hybrid composition can have various types of ordered gyroidal structures. The type of ordered gyroidal structure is defined by the triblock terpolymer and the ratio of the triblock terpolymer to the carbon precursor.

Figure 1B:
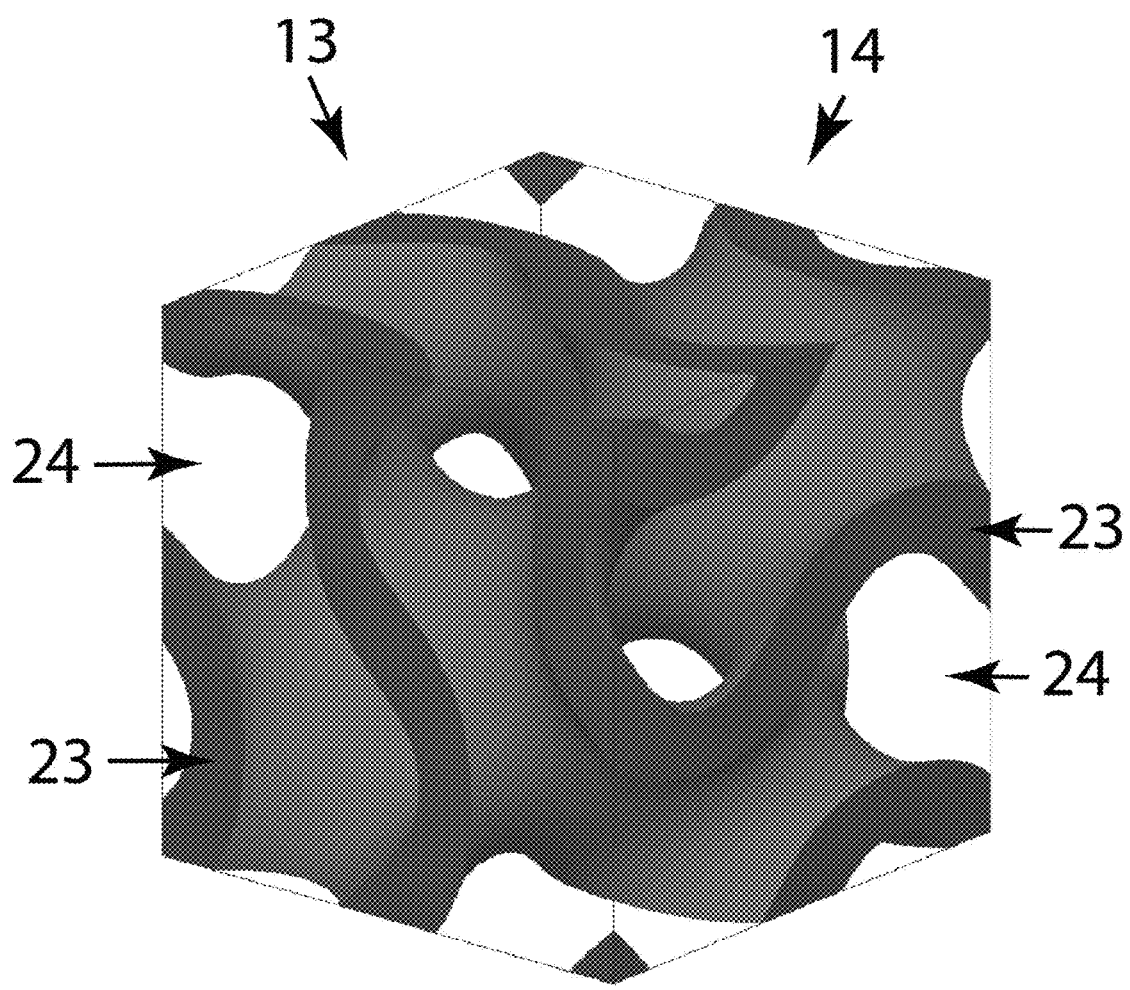
Figure 1C:
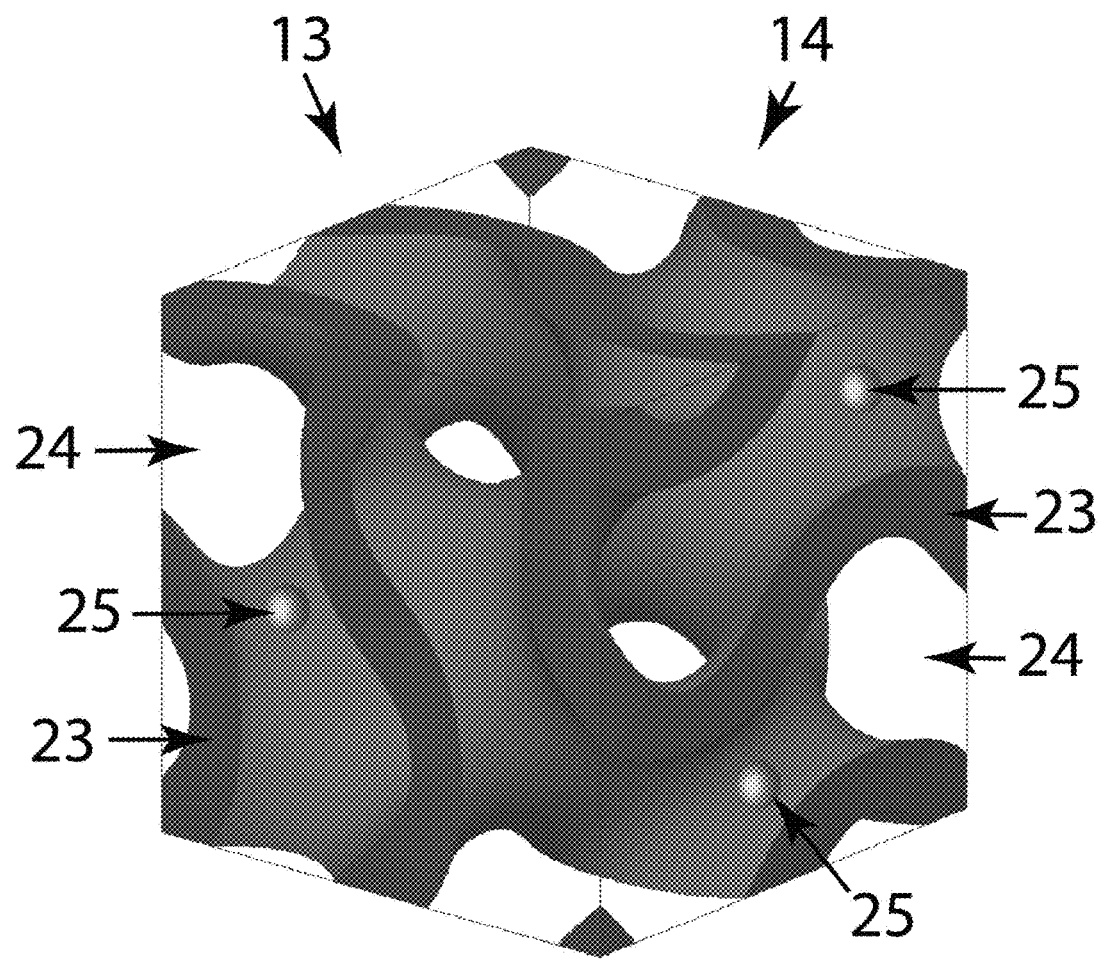

In one embodiment, the ordered gyroidal structure is a core-shell double gyroid morphology (also referred to herein as an ordered core-shell double gyroidal structure). An organic-organic hybrid composition having a core-shell double gyroid morphology can be pyrolyzed to yield a double gyroidal mesoporous carbon (generally referred to herein as "$G^DMC$"). FIG. 1A is a schematic illustrating one example of an organic-organic hybrid composition having an ordered core-shell double gyroid morphology. As shown in FIG. 1A, organic-organic hybrid composition 10 exhibits an ordered core-shell double gyroidal structure 11 that includes first hydrophobic phase 20 (e.g., poly(isoprene)), second hydrophobic phase 21 (e.g., poly(styrene)), and hydrophilic phase/carbon precursor 22 (e.g., poly(ethylene oxide)/resols). Organic-organic hybrid composition 10 of FIG. 1A can be pyrolyzed to yield double gyroidal mesoporous carbon 14 of FIG. 1B.

Figure 2A:
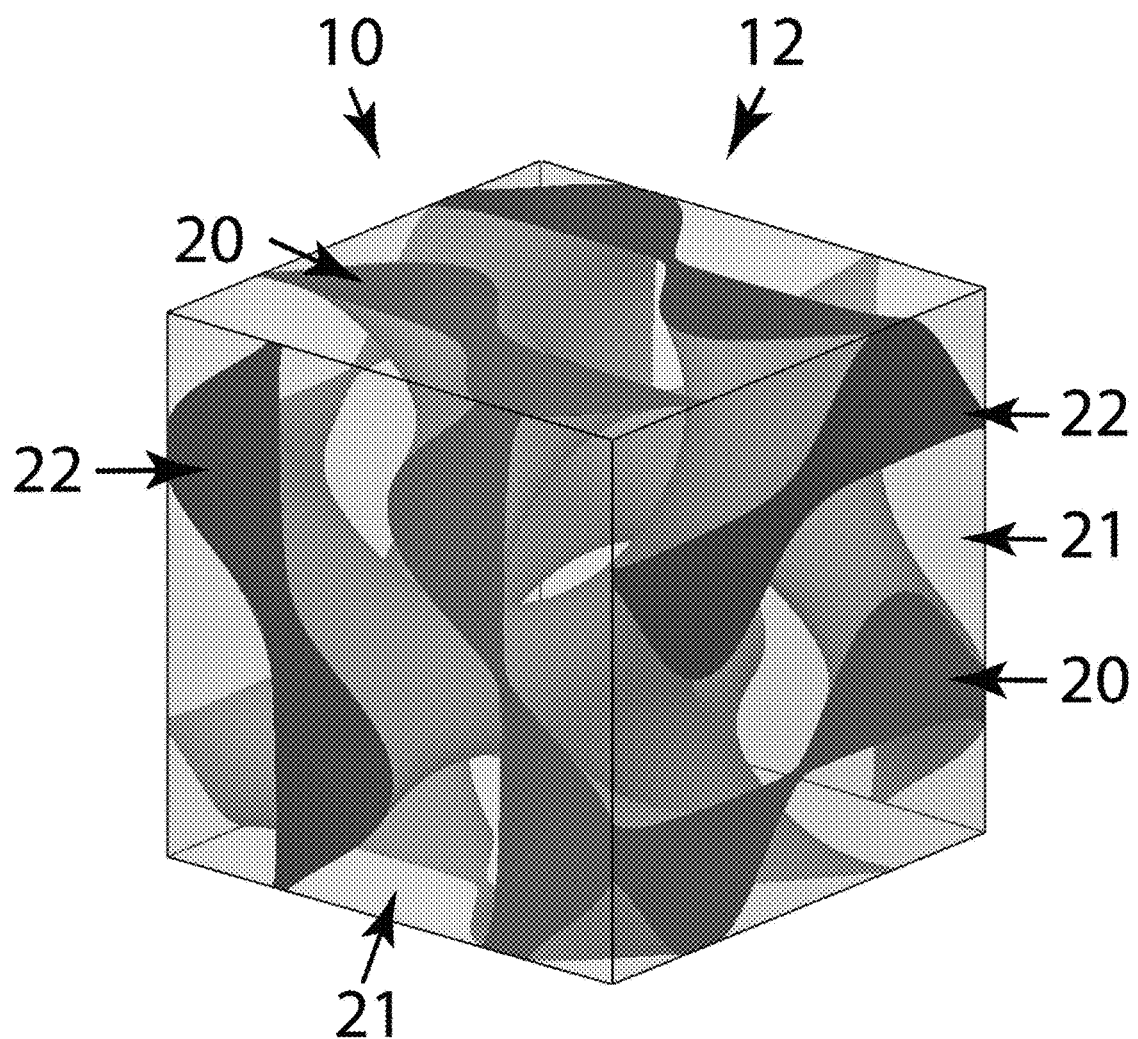
FIGS. 2A-2B.
Figure 2B:
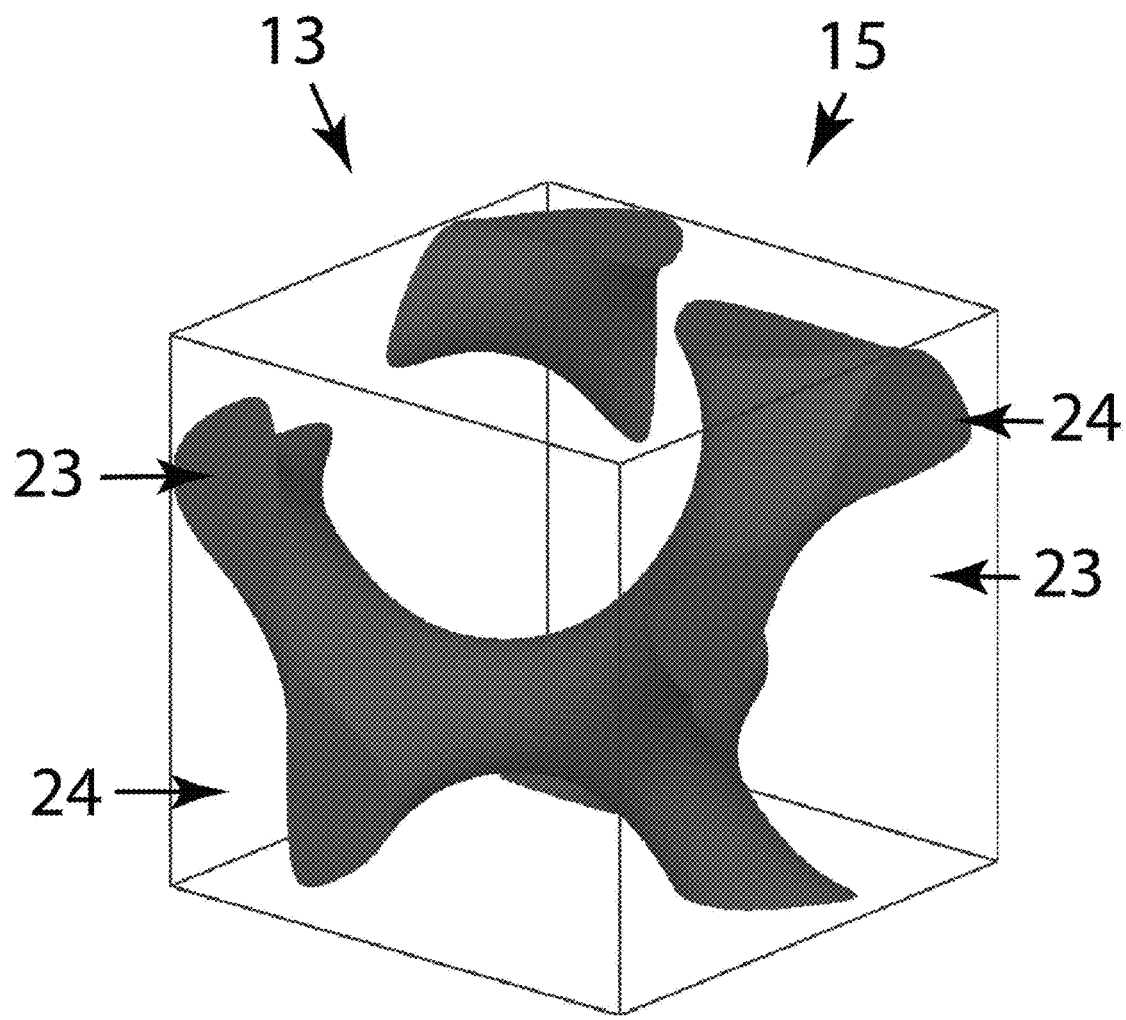

In another embodiment, the ordered gyroidal structure is an alternating gyroid morphology (also referred to herein as an ordered alternating gyroidal structure). An organic-organic hybrid composition having an alternating gyroid morphology can be pyrolyzed to yield a single gyroidal mesoporous carbon (generally referred to herein as "$G^AMC$"). FIG. 2A is a schematic illustrating one example of an organic-organic hybrid composition having an alternating gyroid morphology. As shown in FIG. 2A, organic-organic hybrid composition 10 exhibits an ordered alternating gyroidal structure 12 that includes first hydrophobic phase 20 (e.g., poly(isoprene)), second hydrophobic phase 21 (e.g., poly(styrene)), and hydrophilic phase/carbon precursor 22 (e.g., poly(ethylene oxide)/resols). Organic-organic hybrid composition 10 of FIG. 2A can be pyrolyzed to yield single gyroidal mesoporous carbon 15 of FIG. 2B.

As provided in more detail herein, the organic-organic hybrid compositions of the present invention can be customized to yield gyroidal mesoporous carbons of different porosities and pore sizes (e.g., pore volumes, pore diameters). In a particular embodiment, this can be achieved through the use of an evaporation induced self-assembly (EISA) process of the structure directing triblock terpolymer poly(isoprene)-block-poly(styrene)-block-poly(ethylene oxide) (referred to herein as "ISO") with phenol- or resorcinol-formaldehyde resols as carbon precursors. Pore size tunability can be achieved by using different ISOs with similar composition, but different molar mass. The bicontinuous, ordered carbon materials show surprisingly good structure retention after heat treatment at temperatures as high as 1600° C. This high temperature stability allows for thermal tunability of the microstructure of the carbon as well as the microporosity.

In certain embodiments, the triblock terpolymer may be replaced with a "diblock copolymer." As used herein, the term "diblock copolymer" generally refers to amphiphilic diblock copolymers with a hydrophilic block. For example, suitable diblock copolymers can include any of the triblock terpolymers disclosed herein, except without the first or the second block. Various examples can include, without limitation, poly(styrene)-block-poly(ethylene oxide), poly(isoprene)-block-poly(ethylene oxide), poly(styrene)-block-poly(4-vinyl pyridine), poly(isoprene)-block-poly(4-vinyl pyridine), poly(styrene)-block-poly(2-vinyl pyridine), poly(isoprene)-block-poly(2-vinyl pyridine), poly(styrene)-block-poly(glycidyl methacrylate), poly(isoprene)-block-poly(glycidyl methacrylate), poly(styrene)-block-poly(dimethyl amino ethyl methacrylate), poly(isoprene)-block-poly(dimethyl amino ethyl methacrylate), poly(styrene)-block-poly(methacrylic acid), poly(isoprene)-block-poly(methacrylic acid), and the like Gyroidal Mesoporous Carbon In one aspect, the present invention provides a mesoporous carbon composition comprising a gyroidal mesoporous carbon.

As generally used herein, the term "gyroidal mesoporous carbon" refers to a material that is comprised of over 50 atom % carbon, with an ordered cubic symmetry, and mesopores with a diameter of between about 2 and about 50 nanometers (nm). In a particular embodiment, the gyroidal mesoporous carbon of the present invention comprises an ordered gyroidal structure and mesopores having a pore size of greater than 11 nm in diameter, up to 50 nm in diameter. In certain embodiments, the gyroidal mesoporous carbon includes no nitrogen or substantially no nitrogen.

As used herein, the term "mesopore" refers to a pore in the gyroidal mesoporous carbon of the present invention having a diameter of between about 2 and about 50 nm. In certain embodiments, the mesopore has a diameter of between about 11 and about 50 nm. In certain other embodiments, the mesopore has a diameter of about 2-45 nm, about 2-40 nm, about 2-35 nm, about 2-30 nm, about 2-25 nm, about 2-20 nm, about 2-15 nm, about 2-10 nm, or about 2-5 nm. In certain other embodiments, the mesopore has a diameter of about 5-50 nm, about 10-50 nm, about 15-50 nm, about 20-50 nm, about 25-50 nm, about 30-50 nm, about 35-50 nm, about 40-50 nm, or about 45-50 nm. In certain other embodiments, the mesopores have a pore size that is greater than 12 nm, greater than 15 nm, greater than 20 nm, greater than 25 nm, greater than 30 nm, greater than 35 nm, greater than 40 nm, or greater than 45 nm.

In certain embodiments, the mesopores may be referred to as having an "ultralarge pore size." As used herein, the term "ultralarge pore size" refers to a pore of a diameter of more than 15 nm.

In certain embodiments, the ordered gyroidal structure of the gyroidal mesoporous carbon can comprise a double gyroidal mesoporous carbon morphology, a single gyroidal mesoporous carbon morphology, a monolithic gyroidal mesoporous carbon morphology, or combinations thereof.

More specifically, the single gyroidal mesoporous carbon exhibits a structure that belongs to the space group $I4_132$ and can be described mathematically as the volume enclosed by the surface that is constructed by:

$$\sin(x)\cos(y)+\sin(y)\cos(z)+\sin(z)\cos(x)=u$$

with u being non-zero.

More specifically, the double gyroidal mesoporous carbon exhibits a structure that belongs to the space group $Ia\bar{3}d$ and can be described mathematically as the volume enclosed by the surface that is constructed by $$(\sin(x)\cos(y)+\sin(y)\cos(z)+\sin(z)\cos(x))^2=v$$

with v being a positive number.

As provided herein, the gyroidal mesoporous carbon is tunable for various characteristics, including, without limitation, characteristics such as porosity, pore volume, pore size, thermal stability, and the like.

In certain embodiments, the gyroidal mesoporous carbon has a porosity of between about 30 and about 80 volume percent (vol %). In other embodiments, the gyroidal mesoporous carbon has a porosity of about 30-75 vol %, about 30-70 vol %, about 30-65 vol %, about 30-60 vol %, about 30-55 vol %, about 30-50 vol %, about 30-45 vol %, about 30-40 vol %, or about 30-35 vol %. In other embodiments, the gyroidal mesoporous carbon has a porosity of about 35-80 vol %, about 40-80 vol %, about 45-80 vol %, about 50-80 vol %, about 55-80 vol %, about 60-80 vol %, about 65-80 vol %, about 70-80 vol %, or about 75-80 vol %.

In certain embodiments, the gyroidal mesoporous carbon has a pore volume of between about 0.25 and about 2.0 cm$^3$ g$^{-1}$. In other embodiments, the gyroidal mesoporous carbon has a pore volume of about 0.25-1.9 cm$^3$ g$^{-1}$, about 0.25-1.8 cm$^3$ g$^{-1}$, about 0.25-1.7 cm$^3$ g$^{-1}$, about 0.25-1.6 cm$^3$ g$^{-1}$, about 0.25-1.5 cm$^3$ g$^{-1}$, about 0.25-1.4 cm$^3$ g$^{-1}$, about 0.25-1.3 cm$^3$ g$^{-1}$, about 0.25-1.2 cm$^3$ g$^{-1}$, about 0.25-1.1 cm$^3$ g$^{-1}$, about 0.25-1.0 cm$^3$ g$^{-1}$, about 0.25-0.9 cm$^3$ g$^{-1}$, about 0.25-0.8 cm$^3$ g$^{-1}$, about 0.25-0.7 cm$^3$ g$^{-1}$, about 0.25-0.6 cm$^3$ g$^{-1}$, about 0.25-0.5 cm$^3$ g$^{-1}$, about 0.25-0.4 cm$^3$ g$^{-1}$, or about 0.25-0.3 cm$^3$ g$^{-1}$. In other embodiments, the gyroidal mesoporous carbon has a pore volume of about 0.3-2.0 cm$^3$ g$^{-1}$, about 0.4-2.0 cm$^3$ g$^{-1}$, about 0.5-2.0 cm$^3$ g$^{-1}$, about 0.6-2.0 cm$^3$ g$^{-1}$, about 0.7-2.0 cm$^3$ g$^{-1}$, about 0.8-2.0 cm$^3$ g$^{-1}$, about 0.9-2.0 cm$^3$ g$^{-1}$, about 1.0-2.0 cm$^3$ g$^{-1}$, about 1.1-2.0 cm$^3$ g$^{-1}$, about 1.2-2.0 cm$^3$ g$^1$, about 1.3-2.0 cm$^3$ g$^{-1}$, about 1.4-2.0 cm$^3$ g$^{-1}$, about 1.5-2.0 cm$^3$ g$^{-1}$, about 1.6-2.0 cm$^3$ g$^1$, about 1.7-2.0 cm$^3$ g$^{-1}$, about 1.8-2.0 cm$^3$ g$^{-1}$, or about 1.9-2.0 cm$^3$ g$^{-1}$.

Pore volume and porosity can be calculated using methods known in the art. For example, pore volume can be obtained from the amount of nitrogen adsorbed at a relative pressure of 0.99. The porosity can be calculated using the specific volume for carbon (inverse carbon density) of 0.5 cm$^3$/g with the formula: Porosity (vol %)=Pore Volume (cm$^3$/g)/(Pore Volume (cm$^3$/g)+0.5 cm$^3$/g)×100.

In certain embodiments, the gyroidal mesoporous carbon has an ordered gyroidal structure that is thermally stable at temperatures at least greater than 1250° C. and up to about 2000° C. In certain embodiments, the gyroidal mesoporous carbon has an ordered gyroidal structure that is thermally stable at temperatures of up to about 1200° C., up to about 1225° C., up to about 1250° C., up to about 1275° C., up to about 1300° C., up to about 1325° C., up to about 1350° C., up to about 1375° C., up to about 1400° C., up to about 1425° C., up to about 1450° C., up to about 1475° C., up to about 1500° C., up to about 1525° C., up to about 1550° C., up to about 1575° C., up to about 1600° C., up to about 1625° C., up to about 1650° C., up to about 1675° C., up to about 1700° C., up to about 1725° C., up to about 1750° C., up to about 1775° C., up to about 1800° C., up to about 1825° C., up to about 1850° C., up to about 1875° C., up to about 1900° C., up to about 1925° C., up to about 1950° C., or up to about 1975° C.

In one embodiment, the gyroidal mesoporous carbon further comprises nanopores to provide increased surface area. As used herein, the term "nanopore" generally refers to a pore having a diameter of less than about 5 nm, where the pore is in the form of an indent on the surface of the gyroidal mesoporous carbon, a roughened surface of the gyroidal mesoporous carbon, a hole extending from the surface into the gyroidal mesoporous carbon, a crack or hole through the carbon wall/network/phase of the gyroidal mesoporous carbon, or a pore inside the carbon phase of the gyroidal mesoporous carbon.

Figure 3:
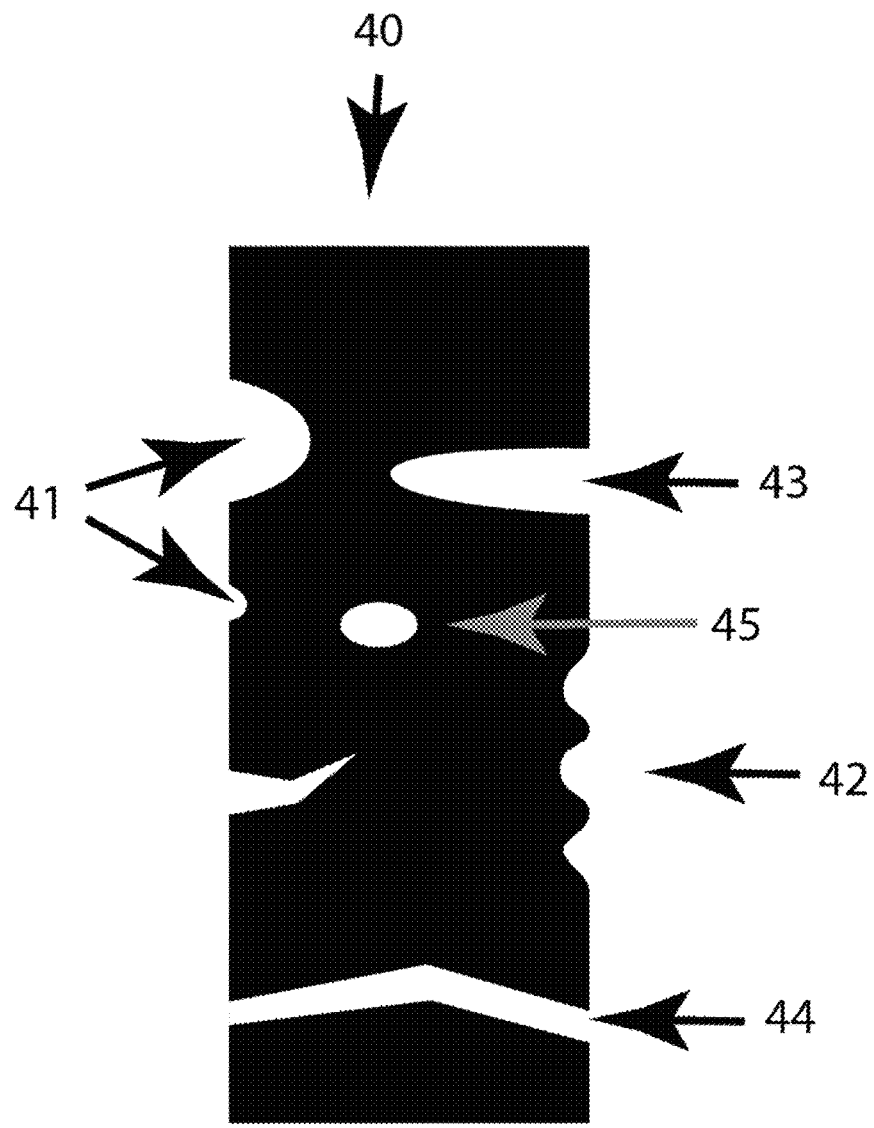
FIG. 3: Schematic of a cross-sectional view of one embodiment of a gyroidal mesoporous carbon of the present disclosure.

Nanopores in the gyroidal mesoporous carbon materials of the present invention can be obtained via low temperature (e.g., 600° C. or above) carbonization, or activation (e.g., with $CO_2$ at temperatures above 850° C.) of the gyroidal mesoporous carbon yielding gyroidal carbons with increased surface area. FIG. 3 is a schematic illustrating the various types of nanopores that can be add to the gyroidal mesoporous carbon of the present invention. As shown in FIG. 3, nanopores can be in the form of surface indent 41 of the carbon phase (e.g., the gyroidal mesoporous carbon), roughened surface 42 of the carbon phase, hole 43 in the surface of the carbon phase, crack/hole 44 through the carbon wall/network/phase, or pore 45 inside the carbon phase, all with a diameter of less than 5 nm.

In another embodiment, the gyroidal mesoporous carbon composition further comprises a dopant or a nanoparticulate.

As used herein, the term "dopant" refers to various elements that are added to the carbon phase of the gyroidal mesoporous carbon of the present invention. More particularly, a "dopant" as used herein refers to a group III, group V, or group VI element as defined herein below. According to the present disclosure, a group III element is an element of the third main group of the periodic table that can act as an electron acceptor. Suitable examples of group III elements include boron and aluminum. According to the present disclosure, a group V or group VI element is an element of the fifth or sixth main groups of the periodic table that can act as an electron donor. Suitable examples of group V or group VI elements include nitrogen, phosphorous, arsenic, antimony, or oxygen, sulfur, selenium, and tellurium.

As used herein, the term "nanoparticulate" refers to a small object with a size of between about 1 nm and about 100 nm. Suitable "nanoparticulates" in accordance with the present invention can include, without limitation, platinum, metals, metal alloys, intermetallics, metal oxides, and silicon oxides.

The mesoporous carbon composition, which comprises the gyroidal mesoporous carbon described herein, can be in various forms, including, without limitation, in the form of a carbon film or a powder.

As used herein, the term "carbon film" refers to a free-standing (non-supported/not supported by a substrate) carbon material with a thickness of more than about 5 microns and up to about 600 microns and in-plane dimensions of more than 100×100 square microns with uniform structure, porosity, and pore size throughout. In certain embodiments, the carbon film is obtained via the EISA synthesis and subsequent pyrolysis of the hybrid film, as further described herein.

As used herein, the term "powder" refers to an assembly of gyroidal mesoporous carbon particles with diameters of more than about 200 nm up to about 100 microns. The powder particles can be random in shape and size distribution. In certain embodiments, powders can be obtained via crushing (e.g., ball milling, or other forms of milling or grinding) of the carbon film.

The mesoporous carbon composition comprising the gyroidal mesoporous carbon of the present invention can be used for various applications. In one aspect, the present invention provides an electrode material comprising a mesoporous carbon composition as described herein. In various embodiments, the electrode material is used in fuel cells, batteries, supercapacitors, capacitive desalination membranes, energy storage devices, energy conversion devices, and the like. Those of ordinary skill in the art can readily determine how to incorporate or manufacture such electrode materials using the mesoporous carbon composition and gyroidal mesoporous carbon of the present invention.

As used herein, the term "network/network topology" is based on Well's definition of "platonic uniform net," as follows: "A net (or network) topology is defined by nodes with a certain connectivity that are linked through planar connectors, and the shortest circuit around each unique node. The shortest circuit is the number of nodes (or connectors) in the smallest loop that can be constructed in the network using two different links from a given node. If all possible combinations of links per note give the same sized smallest circuit, it is called a platonic uniform net, which we use here as our definition of a network and network topology. These networks can be represented by the symbol (n,p), where n is the number of planar connectors in the shortest circuit and p is the connectivity of the nodes. Any distortion or features of the network different from the above described ones are irrelevant for the network topology description/definition. Different structures with the same network topology can be distinguished by adding suffixes to the symbol, i.e. (n,p)-a, (n,p)-b, (n,p)-c, etc., or using names of known structures, e.g. gyroid, diamond, etc." Example: Single gyroid: (10,3)-a. Double gyroid: Two enantiomeric (10,3)-a networks related by inversion symmetry. Ordered bicontinuous alternating diamond (OBAD): (6,4). Ordered bicontinuous double diamond (OBDD): Two (6,4) networks related by translation symmetry. Orthorhombic $O^{70}$: (10,3)-c network. Plumbers Nightmare: (4,6) network. Neovius' surface: (3,12) network.

Manufacture of Gyroidal Mesoporous Carbon Compositions

In one aspect, the present invention relates to a method of making a mesoporous carbon composition comprising a gyroidal mesoporous carbon. The mesoporous carbon composition and the gyroidal mesoporous carbon are as described herein. In certain embodiments, an organic-organic hybrid composition can be used to make the mesoporous carbon composition comprising a gyroidal mesoporous carbon. The organic-organic hybrid composition is also as described herein.

In one embodiment, the method of making the mesoporous carbon composition of the present invention involves the steps of: (i) combining a carbon precursor and a structure-directing triblock terpolymer to yield a self-assembled precursor/terpolymer composite having an ordered gyroidal structure that is defined by the triblock terpolymer and the ratio of the triblock terpolymer to the carbon precursor; and (ii) treating the precursor/terpolymer composite to remove the triblock terpolymer, thereby yielding a gyroidal mesoporous carbon comprising an ordered gyroidal structure and mesopores. The mesopores can have a size as described elsewhere herein, and more particularly can have a pore size of greater than 11 nm in diameter.

The carbon precursor and structure-directing triblock terpolymer used in this method are as described elsewhere herein. The organic-organic hybrid composition described herein above refers to the self-assembled precursor/terpolymer composite having an ordered gyroidal structure that is defined by the triblock terpolymer and the ratio of the triblock terpolymer to the carbon precursor.

In a particular embodiment, the triblock terpolymer can comprise three blocks with increasing hydrophilicity along the polymer chain (non-frustrated triblock terpolymer). The first two blocks are hydrophobic and the third block is hydrophilic. The hydrophilic carbon precursor only has attractive interactions (or selective interactions) with the hydrophilic, third block (e.g., through hydrogen bonds). The gyroidal hybrid composite of the triblock terpolymer and carbon precursor is comprised of three chemically distinct phases: Phase one is made up of the first hydrophobic block of the triblock terpolymer (e.g., poly(isoprene)); Phase two is made up of the second hydrophobic block of the triblock terpolymer (e.g., poly(styrene)); and Phase three is made up of a mixture of the hydrophilic block of the triblock terpolymer and the hydrophilic precursor (e.g., poly(ethylene oxide) and resols).

In one embodiment, prior to the treating step, the method further comprises inducing crosslinking of the carbon precursor contained in the molded component. In order to increase the carbonization yield, some carbon precursors are to be cross-linked (or cured) before carbonization. Cross-linking of the carbon precursor can be done via heat-treatment at temperatures below the triblock terpolymer decomposition temperature (e.g., 400 C). This is followed by heat treatment above the decomposition temperature of the triblock terpolymer yielding a gyroidal mesoporous carbon.

In one embodiment, the combining and treating steps comprise a solvent evaporation induced self-assembly (EISA) process.

More particularly, in one embodiment, the EISA process comprises: (i) dissolving the triblock terpolymer and the carbon precursor in a solvent to yield a triblock terpolymer/carbon precursor mixture; (ii) casting the mixture in a mold to yield a terpolymer/carbon precursor molded component having a desired form; (iii) evaporating the solvent from the triblock terpolymer/carbon precursor molded component; (iv) optionally inducing crosslinking of the carbon precursor contained in the molded component; and (v) pyrolyzing the molded component to remove the triblock terpolymer, thereby yielding the gyroidal mesoporous carbon.

Various solvents suitable for use in an EISA process can be used in the present method. More particularly, suitable solvents for use in the EISA process can include, without limitation, organic solvents, polar organic solvents, protic organic solvents, or mixtures thereof. In certain embodiments, the solvent can include, without limitation, tetrahydrofuran, chloroform, dichloromethane, toluene, dimethyl formamide, benzyl alcohol, dimethyl sulfoxide, methanol, ethanol, propanol, butanol, benzene, dioxane, or mixtures thereof.

Suitable triblock terpolymers for use in the method are as described herein. Suitable carbon precursors for use in the method are as described herein. In one embodiment, the molecular mass (g/mol) ratio of the triblock terpolymer to the carbon precursor is greater than or equal to 200:1 or less than or equal to 3,000:1.

In one embodiment, the method further comprises subjecting the gyroidal mesoporous carbon to an activation process to form nanopores on and/or within the gyroidal mesoporous carbon to increase surface area thereof.

In one embodiment of the method, the activation process is selected from the group consisting of a carbon dioxide activation process and a heat-treatment activation process.

In one embodiment, the method further comprises adding a dopant and/or a nanoparticulate precursor during the combining step. Suitable dopants and nanoparticulates are as described herein.

In a particular embodiment, an ISO-resols system can be used to achieve a particular gyroidal structure. For example, the double gyroidal morphology is obtainable with a hybrid composite of ISO and resols in which the PEO-resols phase comprises 60-75 vol % of the hybrid composite. The alternating gyroidal morphology of which one can achieve the single gyroidal mesoporous carbon can be obtained with a hybrid composite of ISO and resols with a composition of about 20-30 vol % PI, 40-60 vol % PS, and 10-30 vol % PEO-resols phase. The volume percentages are calculated using the densities of the homopolymers of 0.83 g/cm$^3$ for PI, 0.969 g/cm$^3$ for PS, 1.06 g/cm$^3$ for PEO, and 1.1 g/cm$^3$ for resols.

In another aspect, the present invention relates to a mesoporous carbon composition produced according to the method described herein. In a particular embodiment, the mesoporous carbon composition is in the form of a film or a powder.

In another aspect, the present invention relates to an electrode material comprising the gyroidal mesoporous carbon composition made according to the method described herein. More particularly, the electrode material can be used in fuel cells, batteries, supercapacitors, capacitive desalination membranes, energy storage devices, and energy conversion devices.

EXAMPLES

The following examples are intended to illustrate particular embodiments of the present invention, but are by no means intended to limit the scope of the present invention.

Example 1

Synthesis and Characterization of Gyroidal Mesoporous Carbons and Carbon Monoliths with Tunable Ultralarge Pore Size

SUMMARY

Ordered mesoporous carbons (OMC) with high pore accessibility are of great interest as electrodes in energy conversion and storage applications due to their high electric and thermal conductivity, chemical inertness and low density. The metal- and halogen-free synthesis of gyroidal bicontinuous mesoporous carbon materials with uniform and tunable pore sizes through bottom-up self-assembly of block copolymers thus poses an interesting challenge. Four double gyroidal mesoporous carbons (G$^D$MC) with pore sizes of 12 nm, 15 nm, 20 nm, and 39 nm were synthesized using poly(isoprene)-block-poly(styrene)-block-poly(ethylene oxide) (ISO) as structure directing triblock terpolymer and phenol-formaldehyde resols as carbon precursors. The highly ordered materials were thermally stable to at least 1600° C. with pore volumes of up to 1.56 cm$^3$ g$^{-1}$. Treatment at this temperature induced a high degree of sp$^2$-hybridization and low microporosity. Increasing the resols: ISO ratio led to hexagonally packed cylinders with lower porosity. A single gyroid carbon network with high porosity of 80 vol % was obtained using a similar synthesis strategy. Furthermore, we present a method to fabricate monolithic materials of the gyroidal carbons with macroscopic shape and thickness control that exhibit an open and structured surface with gyroidal features. The gyroidal materials are ideally suited as electrode materials in fuel cells, batteries and supercapacitors as their high, three-dimensionally connected porosity is expected to allow for good fuel or electrolyte accessibility and to prevent total pore blockage.

Here we report the tunable synthesis of two gyroidal mesoporous carbon morphologies through the EISA process of the structure directing triblock terpolymer poly(isoprene)-block-poly(styrene)-block-poly(ethylene oxide) (ISO) with phenol- or resorcinol-formaldehyde resols as carbon precursors. We demonstrate the tunability of the materials characteristics such as porosity, pore size and mesostructure by rational design of the soft template. Organic-organic hybrids with the core-shell double gyroid and hybrids with the alternating gyroid morphology result in a double gyroidal carbon matrix and a single gyroidal carbon network after pyrolysis, respectively. Pore tunability was achieved through variation of the triblock terpolymer composition and the respective polymer to resols ratios. The pore size tunability is demonstrated by using three ISOs with similar composition but different molar mass. The bicontinuous, ordered carbon materials show surprisingly good structure retention after heat treatment at temperatures as high as 1600° C. This high temperature stability allows for thermal tunability of the microstructure of the carbon as well as the microporosity. A report by Wang et al. showed the retention of only local order of a hexagonally packed cylindrical carbon mesostructure at 1800° C. with structural collapse at higher temperatures by scanning electron microscopy.[24] However, the long range order of the material treated at these high temperatures was not retained according to small-angle X-ray scattering (SAXS). For the ordered gyroidal mesoporous carbons reported here, up to six clearly identifiably SAXS peaks remained, demonstrating, for the first time, long range order retention at 1600° C.

Much research in electrochemical energy storage focuses on the enhancement of rate capability during charge and discharge of supercapacitors and batteries. Due to better electrolyte accessibility and shorter solid state diffusion length, nanoporous materials have been proven to enhance the rate of charge and discharge while keeping the capacity loss small. However, the standard device design of these electrochemical devices employs powders of the active materials and conductive additives, held together in a film by a polymeric binder. The contact resistance between the micron sized particles causes large ohmic losses, especially at high frequency operations. Therefore, monolithic electrodes without particle-to-particle resistance are highly desirable for future energy storage devices. There are several reports in the literature for ordered mesoporous monolithic carbon materials, usually by hard-templating.[12] Two soft-templating approaches have also been described, i.e. hierarchical macro-mesoporous carbon monoliths from hydrothermal synthesis and EISA.[25-29] The macropores and only micron sized mesoporous walls in the hierarchical carbons assure sufficient release pathways for the decomposition gases and good strain relaxation upon carbonization. In the EISA derived monoliths, carbon-silica composites have been employed. The mechanically robust silica prevents collapse of the monolith during carbonization, but it makes the undesirable extra step of silica removal necessary.[30] These monoliths are typically irregular with ill-defined macroscopic structure and they exhibit unstructured surfaces with broad pore size distributions. In contrast, here we present a silica-free soft-templating method to produce well-defined, ordered, purely mesoporous carbon monoliths with tunable macroscopic dimensions. Furthermore, we report a process to achieve surfaces with narrow pore size distributions that exhibit the same ordered gyroidal features as the bulk of the material.

Methods

Synthesis:

Five poly(isoprene)-block-poly(styrene)-block-poly(ethylene oxide) (ISO) terpolymers were synthesized via sequential anionic polymerization as described before.[32] Results on molar mass, composition and polydispersity index (PDI) are summarized in Table 1. Polymer molar masses vary from 27 kg $mol^{-1}$ up to 108 kg $mol^{-1}$. Polydispersity indices were all below 1.1, demonstrating high control over the terpolymer synthesis.

Oligomeric phenol-formaldehyde resols with a molar mass of less than 500 g $mol^-$ were synthesized using the well-known polymerization of phenol and formaldehyde under basic conditions and worked up in a modified way compared to what has been previously described.[15] In a typical synthesis, 9.411 g of phenol (0.1 mol, redistilled, 99+%, Sigma-Aldrich) was melted in a three neck flask equipped with a reflux condenser in a water bath at 45° C. A 20 wt % sodium hydroxide solution was prepared by dissolution of 0.4 g sodium hydroxide (0.01 mol, pellets, Mallinckrodt) in 1.6 g deionized water. The sodium hydroxide solution was added dropwise to the melted phenol. The sodium phenoxide solution was stirred for 10 minutes and 14.89 mL formalin solution (37 wt % in water, ACS Reagent, Sigma-Aldrich), containing 0.2 mol formaldehyde, was carefully added dropwise over 10 mins. The slightly orange-colored solution was heated to 75° C. and held at this temperature for 1 hour. The orange solution was allowed to cool to room temperature and subsequently neutralized with para-toluene sulfonic acid (≥98.5%, ACS reagent, Sigma-Aldrich). The orange/yellow solution was freeze-dried overnight on a vacuum line and the orange resols were dissolved in a mixture of tetrahydrofuran (Anhydrous, inhibitor free, ≥99.9%, Sigma-Aldrich) and chloroform (anhydrous, ≥99%, Sigma-Aldrich) (1:1 wt). The resulting cloudy solution was filtered through a PTFE syringe filter (0.2-0.4 μm) to remove the precipitated sodium para-toluene sulfonate, dried again overnight on a vacuum line and dissolved in tetrahydrofuran:chloroform (1:1 wt) as a 25 wt % solution. Oligomeric resorcinol-formaldehyde resols were synthesized in a similar way. A highly concentrated resorcinol solution in water was used (50 wt %) and mixed with a 20 wt % sodium hydroxide solution and formalin solution. The molar ratio of resorcinol:NaOH:formaldehyde was 1:0.1:1. The mixture was stirred for 10 mins at room temperature and promptly neutralized with para-toluene sulfonic acid. The red solution was freeze-dried overnight on a vacuum line and the solid resorcinol-formaldehyde resols were dissolved in tetrahydrofuran. The resulting cloudy solution was filtered through a PTFE syringe filter (0.2-0.4 μm) to remove the precipitated sodium para-toluene sulfonate and higher molar mass resins, dried again overnight on a vacuum line and dissolved in tetrahydrofuran as a 20 wt % solution. The molar mass of the synthesized resorcinol-formaldehyde resols was larger than the phenol based resols as indicated by a shorter elution time in gel permeation chromatography. However, the elution time was slightly longer than of a poly(styrene) standard with a molar mass of 1010 g $mol^{-1}$, indicating a smaller hydrodynamic radius than the poly(styrene) standard.

Organic-organic hybrids were synthesized through evaporation induced self-assembly (EISA). The prepared resols solution was added to solutions of the ISO terpolymers in a 1:1 weight mixture of tetrahydrofuran and chloroform yielding a 4-10 wt % solution and stirred for 24 hours in the case of phenol-formaldehyde resols and 1 hour in the case of resorcinol-formaldehyde resols. The ratios of resols to ISO to obtain the desired gyroidal morphology are summarized in Table 1. The solutions were cast in a Teflon dish at 50° C. covered with a glass dome to ensure a solvent saturated atmosphere throughout the drying process and subsequently cured at 110-130° C. in a convection oven for 24 hours. For carbonization, the cured hybrids were heated at 1° C. $min^{-1}$ to 600° C. and pyrolyzed under inert atmosphere (nitrogen or argon) at 600° C. for 3 hours and then brought to the final temperature (see text) at a rate of 5° C. $min^{-1}$.

Monolithic double gyroidal carbons ($mG^DMC$) were fabricated by cutting the cured organic-organic hybrid monoliths into the desired shape and subsequent heat treatment as described above. For carbon monoliths with open and structured surfaces, the hybrid monoliths were exposed to oxygen/argon plasma for 30-60 mins before carbonization.

Characterization:

The composition of the triblock terpolymers was calculated using $^1H$ nuclear magnetic resonance ($^1H$ NMR) spectroscopy. The polymers were dissolved in deuterated chloroform (Chloroform-d, 99.8 atom % D, Aldrich) with a concentration of 15-20 mg $mL^{-1}$. $^1H$ NMR spectra were recorded on a Varian Mercury spectrometer at 300 MHz.

Gel permeation chromatography (GPC) was used to determine the molar mass of the triblock terpolymers and the oligomeric resols. Samples were prepared in tetrahydrofuran (THF) with a concentration of 1.5 mg $mL^{-1}$. GPC measurements were performed in THF at 23° C. (1 mL $min^{-1}$) on a Waters Ambient-Temperature GPC system equipped with a Waters 2410 differential refractive index (RI) detector.

The morphology of the organic-organic composites and porous carbon materials were determined using a combination of small angle X-ray scattering (SAXS), brightfield transmission electron microscopy (TEM) and scanning electron microscopy (SEM).

TEM samples of composite films were prepared by cryo ultramicrotoming to a thickness of 50-70 nm using a Leica Ultracut UCT Cryo-Ultramicrotome equipped with a diamond knife at −60° C. The microtomed sections were floated on a water/DMSO (40:60 vol) mixture and subsequently placed on copper grids. Contrast was obtained by staining the samples with osmium tetroxide vapor (60 mins). Heat-treated porous materials were crushed in a ball mill, dispersed in ethanol and dropped onto carbon-coated copper grids. Bright field transmission electron microscopy (TEM) was performed on a FEI Tecnai T-12 TWIN TEM operating at an accelerating voltage of 120 kV equipped with a high resolution, thermoelectrically-cooled Gatan Orius® dual-scan CCD camera. HR-TEM images were obtained on a FEI-F20-TEM-STEM operating at an accelerating voltage of 200 kV. Scanning electron microscopy (SEM) of carbonized samples was carried out on a Zeiss LEO 1550 FE-SEM operating at an accelerating voltage of 10 kV. Due to the conductivity of the samples, no additional coating of the specimen was necessary.

For SAXS measurements, small squares of the cured composites and pyrolyzed films (ca. 2×2 mm$^2$) were cut and placed in the hole of a metal washer that was covered on one side with Kapton tape. SAXS measurements were performed at the Cornell High Energy Synchrotron Source (CHESS). The sample to detector distance was 2.6 m and the X-ray wavelength was 1.2015 Å. The scattering vector q is defined as $q=(4·\pi/\lambda)·\sin\Theta$, where $\Theta$ is half of the scattering angle.

X-ray diffraction patterns were obtained on an Ultima IV multipurpose X-ray diffraction system from Rigaku using Cu Kα radiation (40V, 44 mA, wavelength 1.5418 Å) in a 2θ range between 10° to 90° with a speed of 5° min$^{-1}$.

For Raman spectroscopy, a Renishaw InVia Confocal Raman microscope was used at room temperature in a backscattering geometry, equipped with a 488 nm diode laser as an excitation source focused on the sample with a 50× magnification.

Sorption isotherms were obtained on a Micromeritics ASAP 2020 surface area and porosity analyzer at −196° C. The samples were degassed at 200° C. under vacuum for at least 10 hours prior to measurements. The specific surface areas were determined using the Brunauer-Emmett-Teller (BET) method. Pore size distributions were calculated using the Barrett-Joyner-Halenda (BJH) method.[34,35] The pore volume is obtained from the amount of nitrogen adsorbed at a relative pressure of 0.99. The porosity is calculated using the specific volume for carbon (inverse carbon density) of 0.5 cm$^3$/g with the formula: Porosity (vol %)=Pore Volume (cm3/g)/(Pore Volume (cm3/g)+0.5 cm3/g)×100.

Results and Discussion

Figure 4:
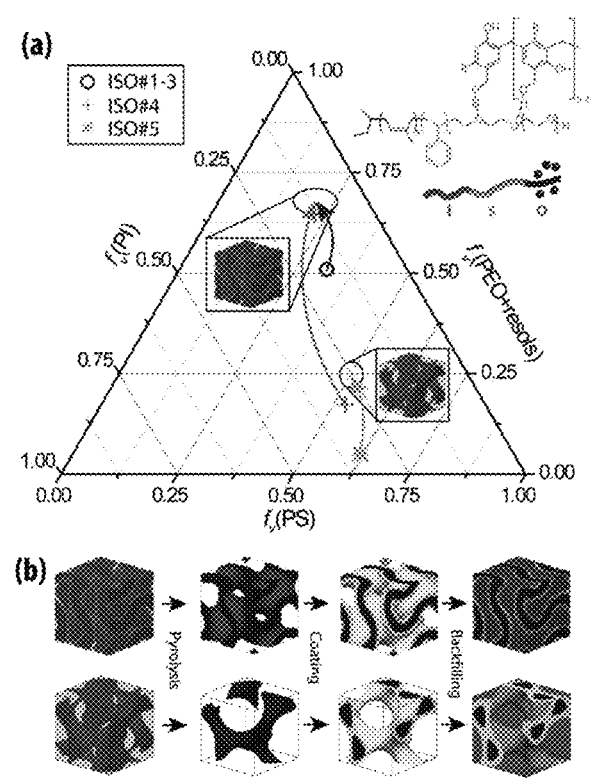
FIGS. 4A-4B: (A) Ternary volume fraction phase portrait that shows the reported ISO triblock terpolymer compositions and gyroidal hybrid compositions after incorporation of resols into the PEO block of the terpolymers. Inset shows the proposed mechanism of formation of resols-ISO organic-organic hybrids through self-assembly of the hydrogen bonded assembly. (B) Illustration of gyroidal structures and formation of gyroidal mesoporous carbon networks through decomposition of the triblock terpolymer and pyrolysis of the carbon precursor. The coating and backfilling steps are proposed routes to convert the carbon networks into two- and three-component functional nanocomposites. Top row: formation of core-shell double gyroid structure. Bottom row: formation of alternating gyroid structure.
Figure 6:
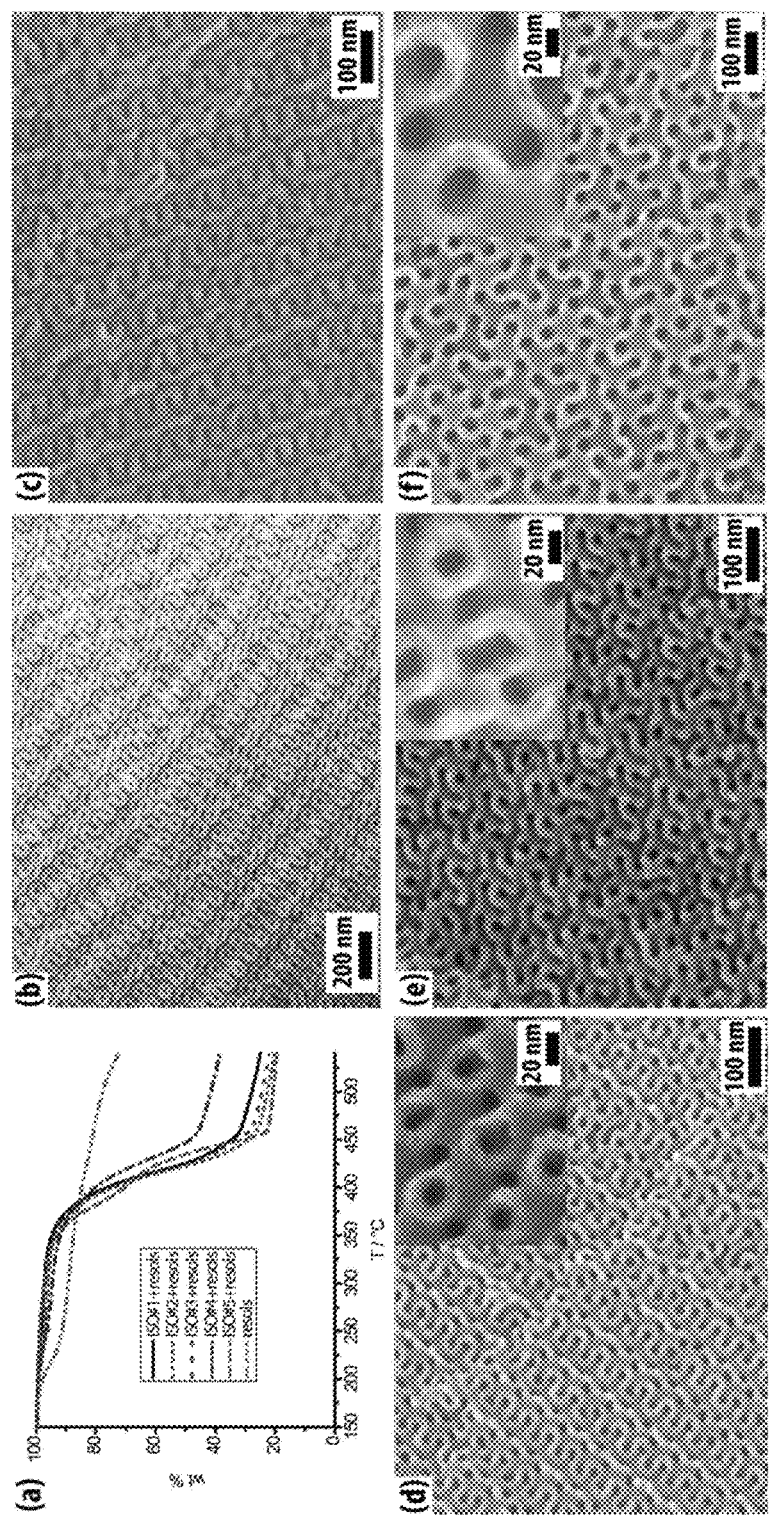
FIGS. 6A-6F: (A) Thermogravimetric analysis curves of all 5 reported ISO-resols hybrids and pure phenol/formaldehyde resols. (B) Transmission electron micrograph of ISO#2-resols hybrid stained with osmium tetroxide (selectively stains poly(isoprene)), showing the double gyroidal (211) plane. Scanning electron microscopy (SEM) images of (C) GDMC#4-12-1600 (D) GDMC#1-15-900, (E) GDMC#2-20-900 and (F) GDMC#3-39-1600. Insets show images taken at higher magnification to demonstrate the difference in pore size and similarities in wall thickness between the 3 double gyroidal carbon materials derived from ISO#1-3.

Characterization of Mesostructure:

The formation of mesoporous carbon materials by block copolymer structure direction of phenol- or resorcinol-formaldehyde carbon precursors is illustrated in FIG. 4. Five poly(isoprene)-block-poly(styrene)-block-poly(ethylene oxide) (ISO) terpolymers with polydispersity indices of 1.04-1.07 (Table 1) were synthesized using anionic polymerization to serve as the soft template for the preparation of gyroidal mesoporous carbon structures by evaporation induced self-assembly (EISA). Briefly, in this process a solution of the carbon precursor and the terpolymer template is slowly evaporated to dryness, leading to microphase separation of the block terpolymer. The hydrophilic carbon precursor forms hydrogen bonds with the hydrophilic poly (ethylene oxide) (PEO) block of the terpolymer, which ensures that the carbon precursor is embedded in the PEO block, selectively swelling this phase.[33] The organic-organic hybrid film is subsequently annealed to cure the phenolic resols. Further heat treatment under inert atmosphere condenses the resols to a highly cross-linked resin while the block copolymer decomposes (FIG. 4 and FIG. 6A) yielding an ordered gyroidal mesoporous polymeric resin. Pyrolysis at temperatures above 600° C. leads to carbonization of the resin to form the desired gyroidal mesoporous carbons with tailored porosity and pore sizes.

Figure 11:
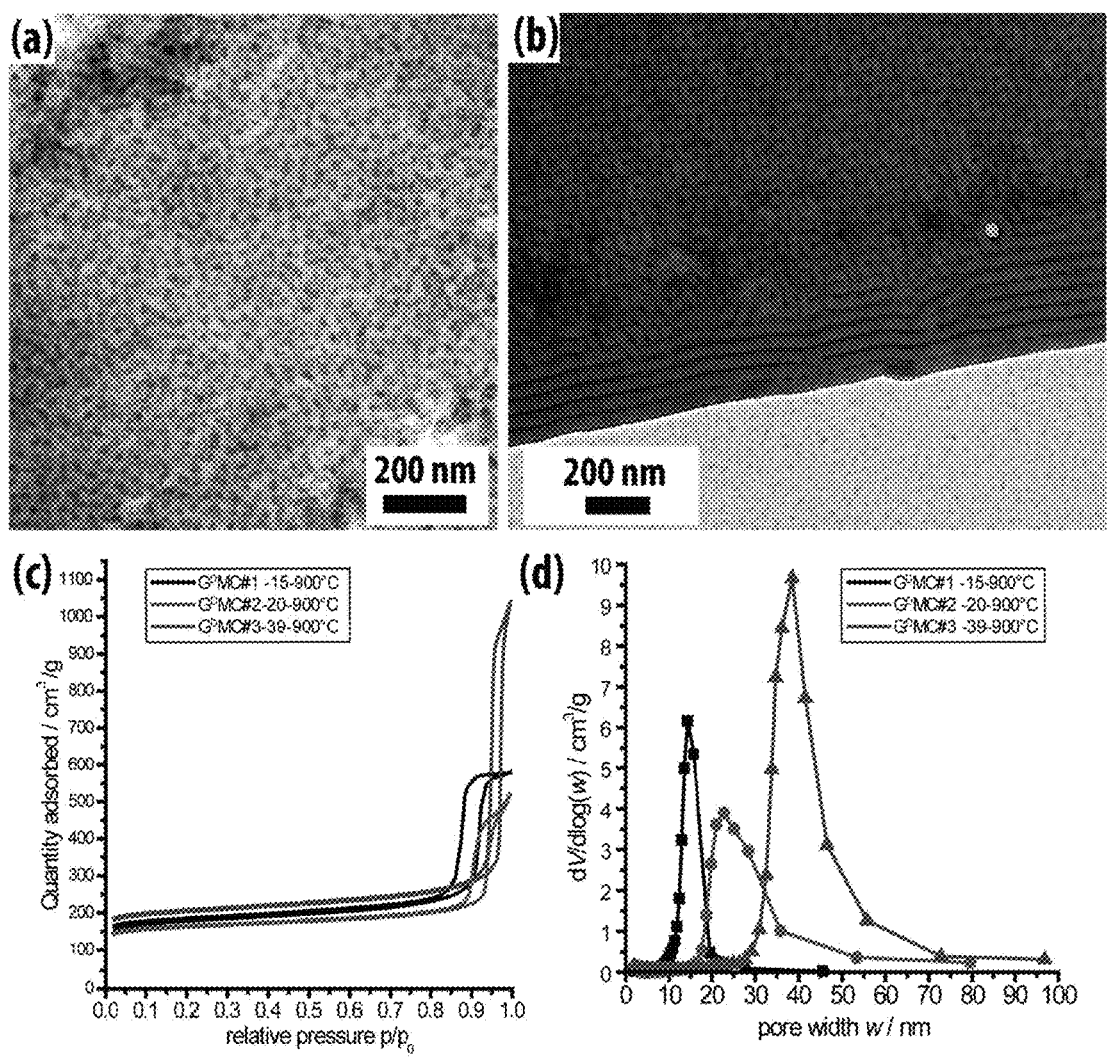
FIGS. 11A-11D: (A) Transmission electron microscopy image of ISO#2+resols following a synthetic procedure from the literature[1] with only THF as the solvent and 1 hour stirring time only. (B) TEM image of the microtomed cross-section of a monolithic film m$G^DMC\#2$-20-120 at the top surface. The lamellar sheets parallel to the surface are clearly distinguishable from the gyroidal bulk morphology.

During the EISA process, microphase separation occurs when a critical concentration of the polymer/additive is reached in the solution. This process is very sensitive to both the processing parameters and the precursor molecules employed. First, well-defined mesostructures only form in systems in which the different blocks have sufficiently high Flory-Huggins interaction parameters.[38] Second, it is critical to ensure strong and selective hydrogen bonding between the resols and the PEO for selective swelling of this block. The morphology that is formed depends on the volume fractions of the separated microphases and their interaction parameters. With decreasing amount of solvent, the mobility of the polymer decreases until it reaches a kinetically trapped state. If the additive, in this case the resols, is not bonded strongly enough to one of the polymer blocks, the interface between the hydrophilic and hydrophobic phases is unsharp. This leads to unstructured microphase separation or poor structure formation and no long range order. In order to form well defined gyroidal organic-organic hybrids, the solvent system and precursors as well as the mixing time and casting temperature had to be optimized. While protocols reported in the literature for block copolymer-resols structure direction[19-21] resulted in limited structure formation and order (FIG. 11A), optimization of the above mentioned parameters yielded well-defined organic-organic ISO-resols hybrids (FIG. 6B), highlighting the importance of the conditions for film-casting. In our case, the desired gyroidal morphology was only achievable using a casting solution stirred for 24 hours in a solvent system of tetrahydrofuran (THF) and chloroform and elevated casting temperatures for solvent evaporation (FIGS. 6B-6F). Third, to assure structural stability of the ordered nanomaterial during decomposition of the triblock terpolymer template, high enough loading of the cross-linkable precursor is crucial in soft-templating methods, as opposed to hard-templating methods. On the other hand, high porosity and large specific surface areas are desirable for most applications, favoring lower loadings. We specifically designed our triblock terpolymers with different compositions to assure thermal stability and structural integrity through sufficient connectivity of the carbon precursor while yielding tunable porosities between 32 vol % and 80 vol %.

TABLE 1

Triblock terpolymer compositions and resols loadings for gyroidal organic-organic hybrids.

| Polymer | GMC | $M_N^a$ (g/mol) | PDI | $f_V(PI)^b$ | $f_V(PS)^b$ | $f_V(PEO)^b$ | Resols:ISO$^c$ |
|---|---|---|---|---|---|---|---|
| ISO#1 | G$^D$MC#1-15 | 38,891 | 1.06 | 17.7 vol % | 32.5 vol % | 49.8 vol % | 0.58:1 |
| ISO#2 | G$^D$MC#2-20 | 55,993 | 1.06 | 16.7 vol % | 31.2 vol % | 52.1 vol % | 0.73:1 |
| ISO#3 | G$^D$MC#3-39 | 108,311 | 1.07 | 17.7 vol % | 31.6 vol % | 50.7 vol % | 0.50:1 |

TABLE 1-continued

Triblock terpolymer compositions and resols loadings for gyroidal organic-organic hybrids.

| Polymer | GMC | $M_N^a$ (g/mol) | PDI | $f_V(PI)^b$ | $f_V(PS)^b$ | $f_V(PEO)^b$ | Resols:ISO$^c$ |
|---------|-----|-----------------|-----|-------------|-------------|--------------|----------------|
| ISO#4   | $G^DMC\#4$-12 | 27,019 | 1.05 | 30.1 vol % | 52.6 vol % | 17.3 vol % | 1.80:1 |
| ISO#5   | $G^AMC\#5$ | 68,959 | 1.04 | 33.1 vol % | 62.0 vol % | 4.9 vol % | 0.32:1 |

$^a$Determined by combination of $^1$H-NMR and GPC.
$^b$Determined by $^1$H-NMR.
$^c$Weight ratio.

Figure 5:
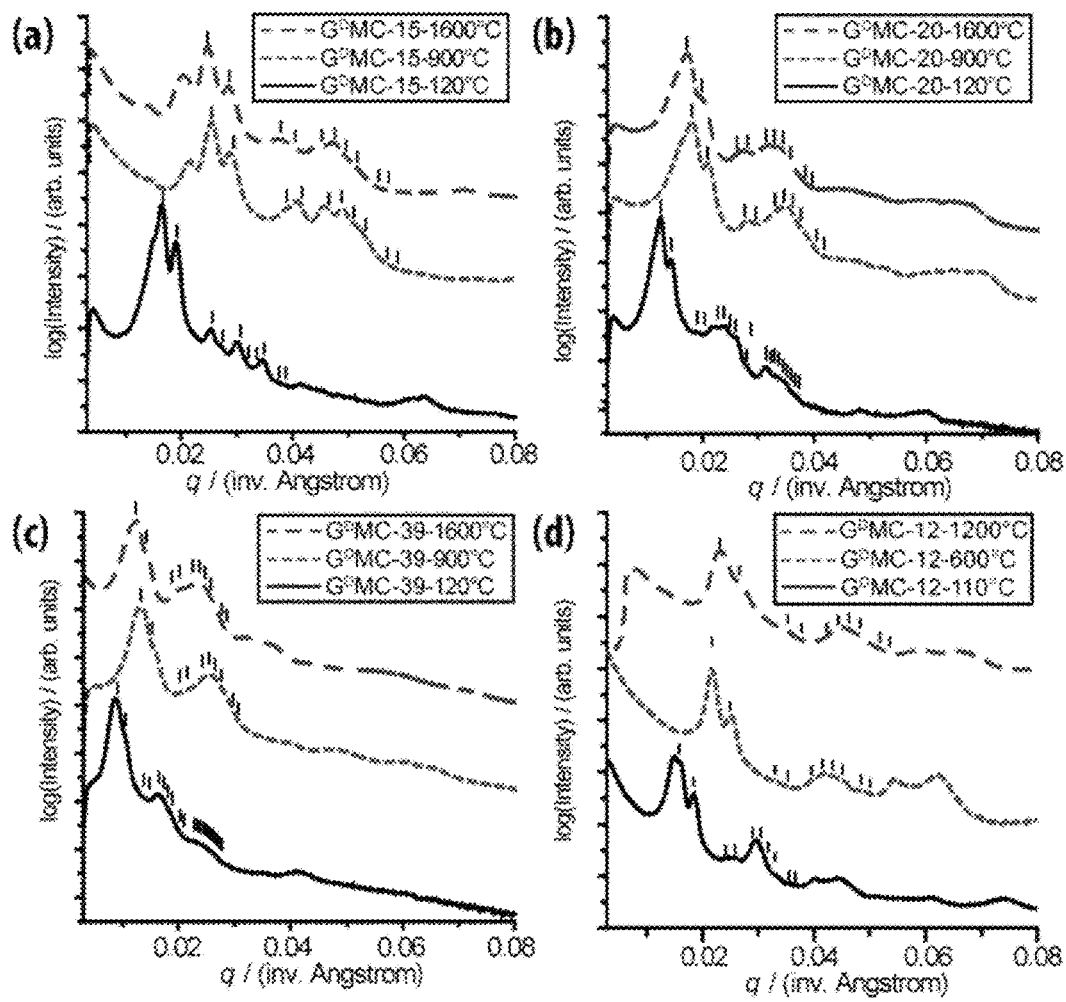
FIGS. 5A-5D: Small-angle X-ray scattering (SAXS) patterns of double gyroidal organic-organic hybrids and double gyroidal mesoporous carbons: (A) $G^DMC\#1$-15, (B) $G^DMC\#2$-20, (C) $G^DMC\#3$-39 and (D) $G^DMC\#4$-12. Black traces after curing at 110-120° C., red traces after pyrolysis at (A-C) 900° C. and (D) 600° C. and blue traces after pyrolysis at (A-C) 1600° C. and (D) 1200° C. The vertical ticks in the SAXS patterns indicate the expected peak positions of the double gyroid lattice ($Q^{230}$).

Double Gyroidal Mesoporous Carbon ($G^DMC$):

Three triblock terpolymers, ISO#1-ISO#3, with a PEO volume fraction of approximately 50 vol % and molar mass of 39 kDa (ISO#1), 56 kDa (ISO#2), and 108 kDa (ISO#3), and a fourth triblock terpolymer ISO#4, with a PEO volume fraction of 17 vol % and a molar mass of 27 kDa, were used for the preparation of ordered mesoporous carbons (OMCs) with double gyroid morphology ($Q^{230}$, $Ia\bar{3}d$) (Table 1 and FIG. 4A). These materials were designated $G^DMC\#X$-Y-Z, where X represents the terpolymer number, Y the approximate final pore size and Z the highest temperature at which the material was heat treated. In the organic-organic hybrid, the hydrophilic phase, consisting of PEO and resols, formed the matrix that separates the two interpenetrating gyroidal poly(isoprene)-block-poly(styrene) core-shell networks (top row in FIG. 4B). In FIG. 5, the well resolved small angle X-ray patterns of the hybrids are shown (lowest trace in each graph). For hybrids from polymers ISO#1, ISO#2 and ISO#4, multiple higher order peaks consistent with the space group $Q^{230}$ were observed, indicating a high degree of long range order. The SAXS pattern for the hybrid obtained from the largest terpolymer ISO#3 showed a broad first order peak with a shoulder on the higher q-side together with broad higher order peaks, making structural assignments based on SAXS data only challenging. The lower resolution of the SAXS pattern for this hybrid as compared to the SAXS patterns of the hybrids from ISO#1, ISO#2 and ISO#4 is due to squeezing of all reflexes into a smaller q range as well as a decreased degree of long range order, as expected for a higher molar mass polymer. In the EISA process, as the solvent evaporates, the hybrids self-assemble into their structures, once a certain concentration is reached. During this self-assembly, the solvent swells the polymer and therefore provides mobility to the polymer chains. When the solvent concentration drops, the system starts to freeze, since the casting temperature is below the glass-transition temperature of the poly(styrene) block. Casting or thermal annealing at temperatures higher than the glass-transition temperature of poly(styrene) is not possible, since it would induce cross-linking of the phenolic resols. Higher molar mass polymers have lower mobility and therefore yield smaller grain sizes and lower long range order than smaller molar mass structure directing polymers. Therefore, the best resolved SAXS patterns are obtained with the smallest triblock terpolymers ISO#1 and ISO#4. Moreover, the different molar masses of the three ISO polymers with similar composition, ISO#1-3, resulted in different characteristic structural length scales of the prepared hybrids. A clear trend of the first order peak that corresponds to the (211) plane of the $Q^{230}$ space group to lower q-values was observed when comparing the patterns for $G^DMC\#1$-15-120, $G^DMC\#2$-20-120 and $G^DMC\#3$-39-120. This decrease corresponds to an increase in the unit cell size of the cubic morphology from 92 nm to 123 nm to 169 nm for hybrids of ISO#1, ISO#2 and ISO#3, respectively, as expected from the increasing molar mass of the three structure directing triblock terpolymers. The organic-organic hybrid of ISO#4 and resols gave a gyroidal unit cell size of 96 nm, only 4% larger than $G^DMC\#1$-15-120. Even though ISO#4 has a 31% smaller molar mass with a more than two times lower PEO fraction than ISO#1, the three times higher resols loading of $G^DMC\#4$-12 made the two hybrids very comparable in composition of the three phases, PI, PS and PEO-resols. This lead to two double gyroidal materials with similar characteristic length scales, but significantly different compositions of the hydrophilic PEO-resols phase, that is $G^DMC\#4$-12 has a much higher resols:PEO ratio than $G^DMC\#1$-15 (FIG. 4A).

The hybrids were subsequently heated under inert atmosphere to decompose the terpolymer and carbonize the resols. First, the hybrids were heated to 600° C. at a rate of 1° C. min$^{-1}$ and held at that temperature for 3 hours to ensure sufficient structure stabilization. For further carbonization, two temperatures were investigated: 900° C. for 3 hours, often employed in literature reports of mesoporous carbons, and 1600° C. for 1 hour, both temperatures reached with a heating rate of 5° C. min$^{-1}$.[19] Upon heat treatment and carbonization, the structure shrinks significantly but is well retained. This is apparent from the well resolved SAXS patterns that, compared to the parent hybrids, were shifted to higher q-values corresponding to smaller unit cell sizes, but retained higher order reflections consistent with a cubic gyroid lattice (middle and upper traces in FIGS. 5A-5D and Table 2). According to the decrease of the unit cell, the structures shrank approximately 30% during decomposition of the polymer and carbonization of the resols. Considering this large change in size, the thermal stability of the mesostructure of these materials is remarkable. To the best of our knowledge, this is the first report of soft-templated materials with long-range ordered and periodic mesostructure after treatment at temperatures as high as 1600° C. The lack of an appropriate furnace inhibited further exploration of the thermal stability at even higher temperatures of these materials. It is noteworthy, that the shrinkage of the structure during heat treatment at 900° C. (for 3 hours) was larger than during the heating at 1600° C. (for 1 hour). We assume that after the stabilization at 600° C., the phenolic resin condensed very slowly. A temperature plateau at 900° C. could allow the mesostructure to relax or condense for a longer time compared to material that is directly heated to 1600° C. and hardened quickly. Additionally, for ISO#1-derived $G^DMC\#1$-15, the SAXS patterns after heat treatment showed an extra peak at lower q-values. The peak matched the (200) peak that is forbidden in the cubic double gyroid morphology. This suggests anisotropic shrinkage of the structure during heat treatment as has been observed for oxide materials in the past.[36] The SAXS pattern of $G^DMC\#4$-12-600 shows multiple higher order peaks consisting with the double gyroid morphology. After heat treatment at 1200° C., the peaks broadened. The gyroidal unit cell of the ISO#4-resols hybrid shrank from 96 nm to 71 nm and 66 nm after pyrolysis at 600° C. and 1200° C., respectively. The characteristic length scale of $G^DMC$#4-12-1200 and $G^DMC$#1-15-1600 only differed by 8%.

Figure 12:
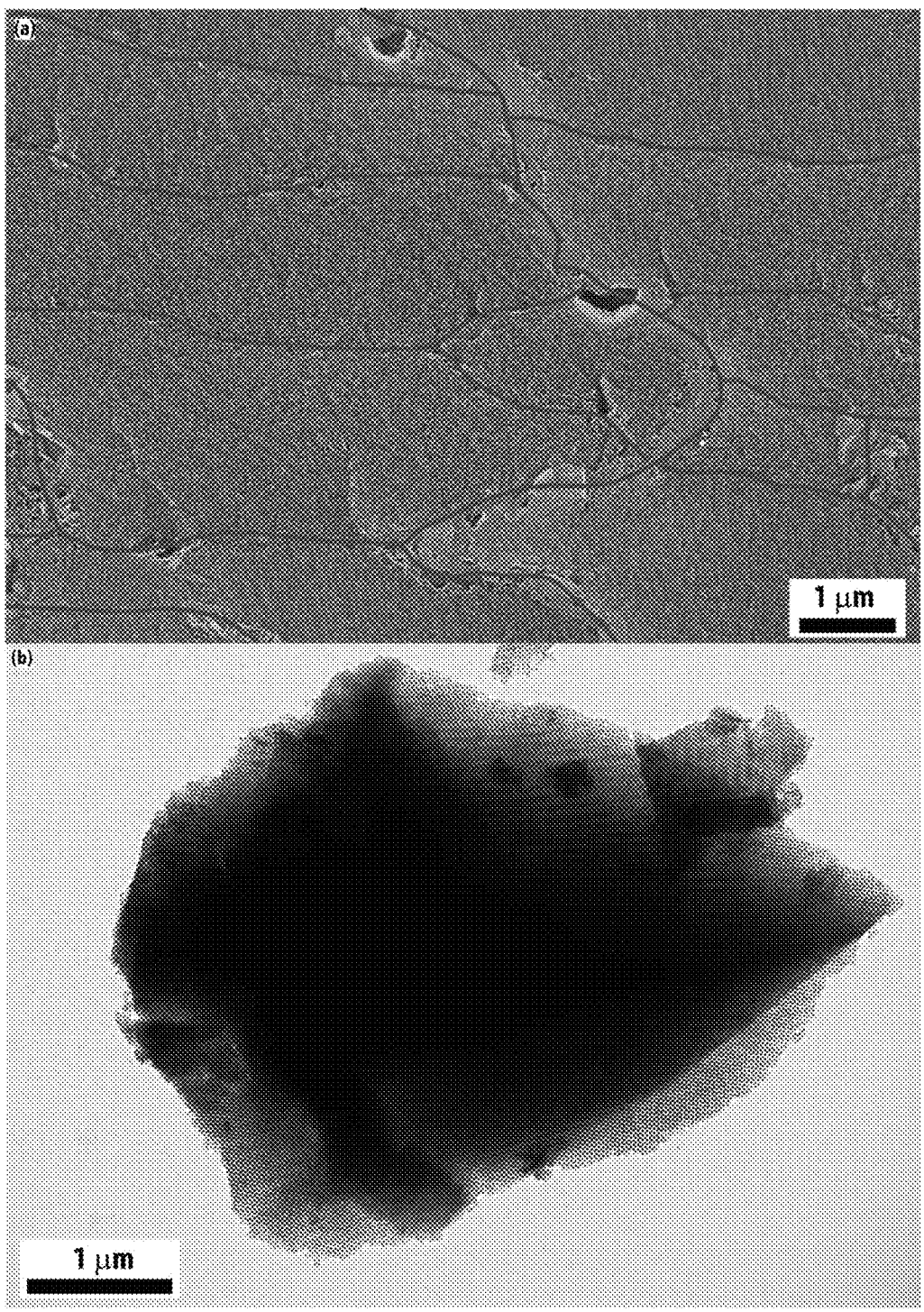

The remarkable structure control as evidenced by SAXS and the assignments to gyroidal structures in all four materials was corroborated by scanning electron microscopy (SEM), see FIGS. 6C-6F. The SEM images show the well defined (211) projection (double wavy pattern) of the double gyroid morphology for all four materials. The extensive long range order of GDMC#1-15-1600, apparent from the well resolved SAXS pattern was also evident from electron microscopy analyses. Grains with diameters of multiple microns were seen in SEM that were connected by thin lamellae grain boundary regions. During crushing of the samples, the grain boundaries are mechanically the weakest points of the structure and mesostructurally "single crystalline" particles with sizes of more than 5 microns were observed in TEM (FIG. 12). While electron microscopy analysis indicated a low porosity for the $G^DMC$#4-12-1200 materials derived from ISO#4 with low PEO fraction and high resols loading, a high porosity was suggested for the materials derived from ISO#1-3 with high PEO fractions and low resols loadings. Thus, the thickness of the pore walls of the latter three investigated double gyroidal mesoporous carbons were measured to be between 10 nm and 15 nm with wall-to-wall distances of approximately 15 nm, 19 nm and 36 nm for $G^DMC$#1-15-1600, $G^DMC$#2-20-1600 and $G^DMC$#3-39-1600, respectively (see insets in FIGS. 6D, 6E, and 6F). In contrast to these high pore-to-wall thickness ratios, the wall thickness and wall-to-wall distance of $G^DMC$#4-12-1600 was measured to be 20 nm and 12 nm, respectively.

molar mass of the terpolymer template. The amount of nitrogen adsorbed at low relative pressure was twice as high for the carbon materials treated at 900° C. (FIG. 11B) compared to the ones treated at 1600° C., indicating a much higher specific surface area. Analysis according to the Brunau-Emmet-Teller (BET) theory resulted in specific surface areas of 529 $m^2$ $g^{-1}$, 606 $m^2$ $g^{-1}$, 551 $m^2$ $g^{-1}$ and 692 $m^2$ $g^{-1}$ for $G^DMC$#4-12-900, $G^DMC$#1-15-900, $G^DMC$#2-20-900 and $G^DMC$#3-39-900, respectively (Table 2). More than two thirds of these specific surface areas were constituted by microporosity. However, pyrolysis of the mesoporous carbons at 1600° C. resulted in a large decrease of the contribution of the micropores to the specific surface area, while the mesopore surface area (obtained through subtraction of the micropore surface area from the total surface area) remained almost unchanged (Table 2). At this temperature, the micropore surface area only contributed 27-30% to the total surface area of $G^DMC$#1-15-1600, $G^DMC$#2-20-1600 and $G^DMC$#3-39-1600, while micropores still contributed 54% to the total surface area for $G^DMC$#4-12-1600, indicating a relation between the carbon wall thickness and microporosity. Nitrogen sorption also confirmed the high porosity for the ISO#1-3 derived materials, supporting the results from SEM analysis. Assuming a carbon density of 2 g $cm^{-3}$, a porosity of 62% was calculated from the pore volumes of around 0.8 $cm^3$ $g^{-1}$ for $G^DMC$#1-15-1600 and $G^DMC$#2-20-1600. With a pore volume of 1.2 $cm^3$ $g^{-1}$, $G^DMC$#3-39-1600 exhibited a high porosity of 71%, even after heat-treatment at 1600° C. By comparison, $G^DMC$#4-12-1600 displayed a significantly lower porosity of 32 vol % as a result of the high content of carbon precursor in the hybrid, which was necessary to achieve the double gyroid morphology from the low PEO content in ISO#4. This demonstrates the tunability of the porosity of the carbon materials by changing the PEO content of the starting

TABLE 2

Structural characteristics of gyroidal mesoporous carbons.

| GMC | Pore size[a] (nm) | Pore volume[b]/$cm^3$/g (micropore volume[c] $cm^3$/g) | BET surface area/$m^2$/g (micropore area[c]/$m^2$/g) | d-spacing[d] (nm) | Carbon:oxygen ratio[e] | Graphitic cluster size[f] (Å) |
|---|---|---|---|---|---|---|
| $G^DMC$#1-15-900 | 15 ± 2 | 0.89 (0.2) | 606 (427) | 60 | 88:12 | 26.8 ± 3.0 |
| $G^DMC$#1-15-1600 | 16 ± 2 | 0.80 (0.06) | 318 (136) | 62 | 91:9 | 37.4 ± 3.0 |
| $G^DMC$#2-20-900 | 19 ± 2 | 0.78 (0.19) | 551 (403) | 86 | 88:12 | 27.0 ± 4.1 |
| $G^DMC$#2-20-1600 | 21 ± 2 | 0.80 (0.03) | 196 (72) | 89 | 92:8 | 37.6 ± 2.1 |
| $G^DMC$#3-39-900 | 39 ± 4 | 1.56 (0.23) | 692 (506) | 116 | 85:15 | 27.2 ± 2.4 |
| $G^DMC$#3-39-1600 | 39 ± 5 | 1.15 (0.03) | 202 (74) | 124 | 90:10 | 36.9 ± 4.0 |
| $G^DMC$#4-12-900 | 11 ± 2 | 0.37 (0.2) | 529 (437) | 71* | 80:20 | 27.1 ± 1.0 |
| $G^DMC$#4-12-1600 | 12 ± 3 | 0.24 (0.06) | 172 (93) | 66** | 86:14 | 34.2 ± 2.2 |
| $G^AMC$#5-900 | 35 ± 5 | 2.01 (0.15) | 588 (332) | 48 | 90:10 | 29.6 ± 3.1 |
| $G^AMC$#5-1600 | 31 ± 9 | 1.41 (0.05) | 348 (120) | 49 | 93:7 | 36.7 ± 5.7 |

[a]Determined by BJH-model applied to nitrogen sorption isotherms.
[b]Based on amount adsorbed at relative pressure of 0.99.
[c]Determined using the t-plot method.
[d]Determined by SAXS.
[e]Determined by XPS.
[f]Determined by fitting of Raman spectra.
*From $G^DMC$-12-600.
**From $G^DMC$-12-1200.

Figure 7:
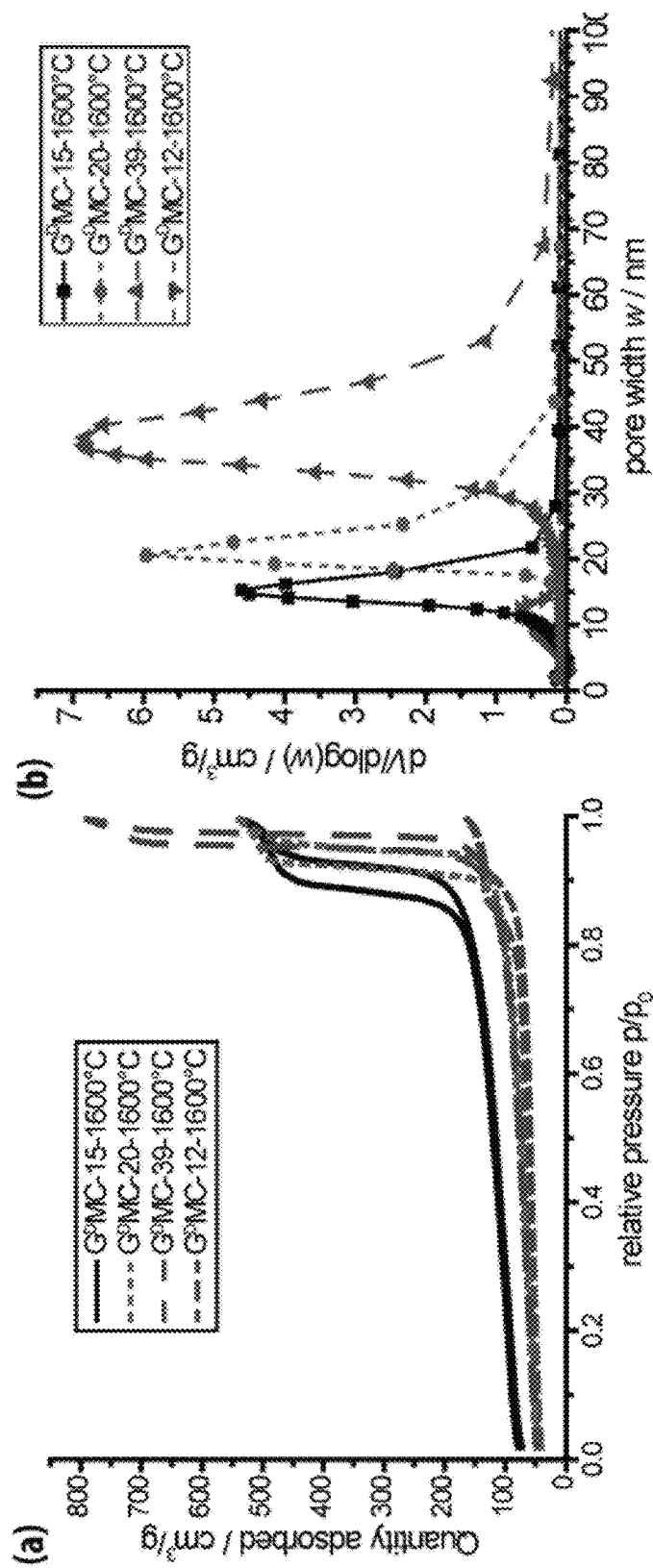
FIGS. 7A-7B: (A) Nitrogen sorption isotherms and (B) pore size distributions of GDMC#1-15-1600, GDMC#2-20-1600, GDMC#3-39-1600, and GDMC#4-12-1600. The pore size distributions were calculated using the BJH model for cylindrical pores.

Nitrogen sorption analysis of the carbonized samples confirmed the presence of mesoporous structures with narrow pore size distributions and tunable porosity. FIG. 7A shows nitrogen sorption isotherms of all four $G^DMC$s pyrolyzed at 1600° C. The isotherms show typical type-IV curves with $H_1$-type hysteresis and sharp capillary condensation above relative pressures of 0.9. The sharp capillary condensation shifted to higher relative pressures with increased polymer. The tunability of the pores was further evidenced by comparing the contributions of micro- and mesopores to the pore volume of the $G^DMC$ materials pyrolyzed at 1600° C. For materials derived from ISO#1-3, the microporosity decreased drastically due to extensive condensation, and its contribution to the pore volume was minimal (Table 2). In most porous carbon materials with high porosity, pores of less than 5 nm diameter make up the majority of the pore volume.[15] In contrast, the large mesopores contributed over 96% of the pore volume in the $G^DMC$#1-15-1600, $G^DMC$#2-20-1600, and $G^DMC$#3-39-1600 materials. The tremendously high temperature stability of the ordered structure of the carbon materials made this high mesoporosity with low microporosity possible. For $G^DMC$#4-12-1600, the micropores still contributed 25% to the total pore volume, showing again that the ratio of micro- and mesoporosity seems to be dependent on the pore wall thickness at these high pyrolysis temperatures.

Analysis of the nitrogen adsorption isotherm using the Barrett-Joyner-Halenda (BJH) method resulted in narrow pore size distributions centered at 12 nm, 16 nm, 21 nm and 39 nm for $G^DMC$#4-12-1600, $G^DMC$#1-15-1600, $G^DMC$#2-20-1600 and $G^DMC$#3-39-1600, respectively (FIG. 7B), consistent with the SEM analysis. To the best of our knowledge, the ultra-large pore size of 39 nm is the largest reported to date for ordered soft-templated carbon materials. It exceeds the largest pore size previously reported, fcc packed spherical pores, by 5% and the largest reported gyroidal mesoporous carbon by more than 300%. This demonstrates the versatile tunability over a wide range of structural and porosity characteristics by rational design of the structure directing block copolymer.

Figure 13:
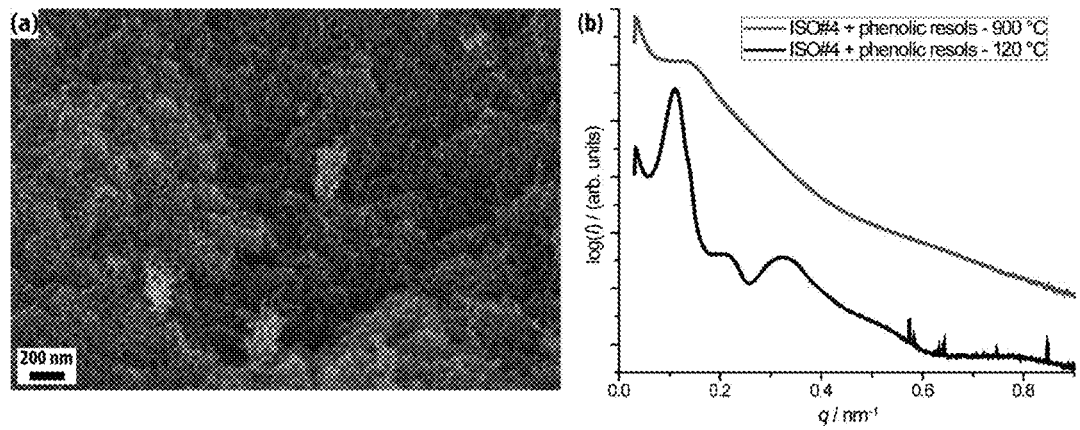

Alternating Gyroidal Mesoporous Carbon ($G^4$ MC):

Another cubic bicontinuous morphology that is thermodynamically stable for triblock terpolymers is the so-called alternating gyroid ($Q^{214}$, $I4_132$).[37] In this morphology, the PI and the PEO end blocks each form a single gyroid network in a PS matrix. The two chemically distinct networks are enantiomeric and interpenetrating (FIG. 4). For the fabrication of $G^4MC$#5, we synthesized the terpolymer ISO#5, with a very low PEO volume fraction of 4.9 vol % and a low polydispersity of 1.04 (Table 1). Following the protocol described above for the successful and well controlled synthesis of double gyroidal organic-organic hybrids, however, we were not able to obtain ordered hybrids using ISO#5 and phenol-formaldehyde resols (FIG. 13). In order to increase the interaction parameter between the hydrophilic and hydrophobic phases in our mixed polymer/resols system, we introduced more phenolic hydroxy groups by using resorcinol-formaldehyde resols as the carbon precursor. This change in precursor functionality lead to the formation of organic-organic hybrids with well ordered network morphology following our protocol, which was subsequently converted into an OMC network by pyrolysis.

Figure 8:
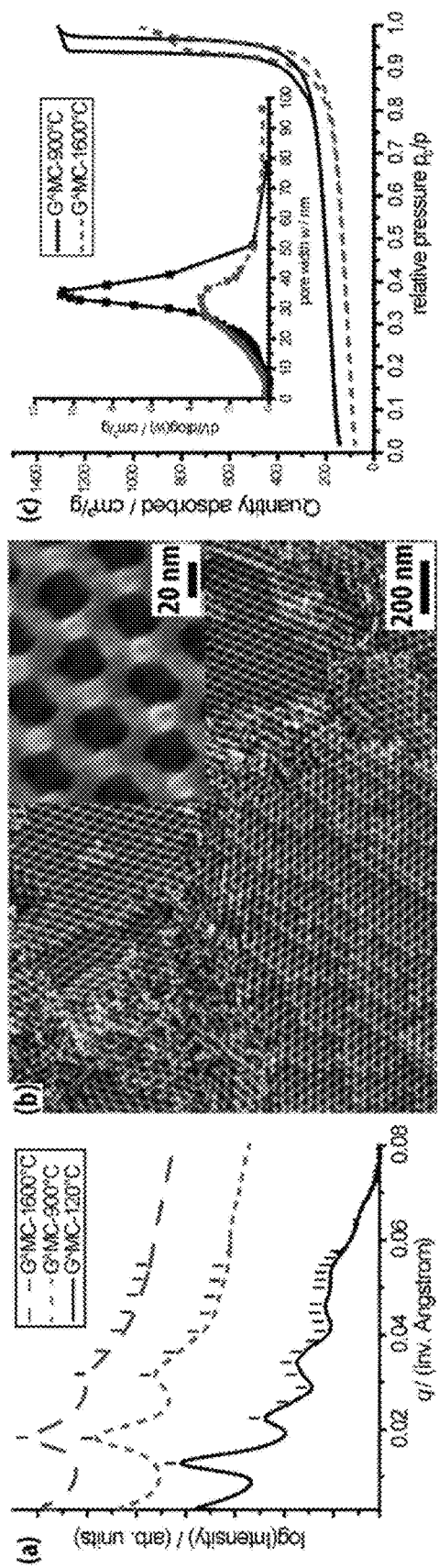
FIGS. 8A-8C: (A) Small angle X-ray scattering (SAXS) patterns, (B) scanning electron microscopy (SEM) image (inset: higher magnification of the (111) projection) after pyrolysis at 1600° C. and (C) nitrogen sorption isotherms with BJH pore size distributions (inset) of alternating gyroidal mesoporous carbons ($G^AMC\#5$).

The SAXS pattern of the organic-organic hybrid from ISO#5 and resorcinol-formaldehyde resols showed multiple peaks, some of which were overlapping (black trace in FIG. 8A). The first sharp peak at a q-value of 0.13 Å$^{-1}$ was followed by a peak at 0.2 Å$^{-1}$ with a shoulder on the higher q-side and a third peak at 0.35 Å$^{-1}$ with a shoulder on either side. The peaks and their shoulders matched the q/q*-ratios of √3, √4, √6, √7 and √8, with q* being the first order peak, consistent with the allowed peaks of the $Q^{214}$ space group. Note that an expected peak at a ratio of √5 to the first order peak did not appear. However, the existence of the peak with a q/q*-ratio of √6, corresponding to the (222) plane, and the absence of a peak with a √2 ratio suggested the formation of the alternating gyroid structure in the organic-organic hybrid. The first peak at 0.13 Å$^{-1}$ corresponds to the (110) plane of the alternating gyroid morphology with a lattice constant of 69 nm.

Upon heat treatment under inert atmosphere, the resorcinol-formaldehyde resols—ISO hybrid was converted into a periodically ordered mesoporous carbon network. The SAXS patterns after pyrolysis shifted to higher q-values and exhibited a lower resolution, in contrast to the double gyroidal mesoporous carbons. This was probably due to the fragility of the single gyroid network that caused non-uniform shrinkage and loss of symmetry. However, a first order peak and a higher order peak with a shoulder on the high q-side were clearly distinguishable. The q/q*-ratio of the peaks and the shoulder were 1, √3 and √4, consistent with the (110), (211) and (220) plane reflections of the $Q^{214}$ space group with $I4_132$ symmetry. However, the gyroidal morphology might not be completely retained after pyrolysis and formation of a structure only closely related to the single gyroidal morphology is also possible.[31] The resolution of the pattern was independent of the pyrolysis temperature. The decrease in unit-cell size of the material before and after heat treatment corresponded to a 30% shrinkage of the periodic single network, very similar to the shrinkage seen in the case of the double gyroidal morphology. To the best of our knowledge, this is the first report of a single gyroidal mesoporous carbon network.

Scanning electron microscopy of the pyrolyzed $G^4MC$#5 supported the formation of a well ordered and periodic, porous single gyroidal network. The highly ordered network that was observed exhibited thin struts that were connected by triple nodes (FIG. 8B). At higher magnification, a honeycomb like structure with two struts per hexagon coming out of the image plane that matches the (111) projection of a single gyroid network was seen (inset in FIG. 8B). From analysis of the SEM images, the diameter of the struts was determined to approximately 15 nm and the pore diameter along the (111) projection was determined to approximately 26 nm. Similar to the SAXS patterns, the order that was seen in the SEM images did not change when the pyrolysis temperature was raised from 900° C. to 1600° C. as evidenced by a similar grain size of the mesostructure on the order of a few microns for materials heated to these temperatures. Considering the low carbon precursor content in the organic-organic hybrid, it is astonishing that the ordered morphology does not collapse upon decomposition of the structure directing triblock terpolymer and excessive condensation of the resin during carbonization at temperatures as high as 1600° C. The SEM images suggest a very high porosity of the single gyroidal carbon network, which is expected from the low resorcinol-formaldehyde resols to ISO ratio, with good structure retention.

Nitrogen sorption confirmed the high porosity of the single gyroidal carbon network (FIG. 8C). For both heat treatment temperatures, the isotherms showed typical type-IV curves with $H_1$-type hysteresis and sharp capillary condensation above relative pressures of 0.95. The amount of nitrogen adsorbed at low relative pressure was almost twice as high for the sample treated at 900° C. compared to the one heated to 1600° C., indicating a much higher specific surface area for the lower temperature treated carbon network. BET analysis resulted in specific surface areas of 588 m$^2$ g$^{-1}$ and 348 m$^2$ g$^{-1}$ for $G^4MC$#5-900 and $G^4MC$#5-1600, respectively. The micropore surface area contributed more than 50% to the total surface area for samples heated at 900° C., and, very similar to the double gyroidal carbons, it decreased to less than 35% after pyrolysis at 1600° C. (Table 2). Pore volumes of 2.01 cm$^3$ g$^{-1}$ and 1.41 cm$^3$ g$^{-1}$ for samples treated at 900° C. and 1600° C., respectively, were observed by nitrogen sorption. These values exceeded the highest obtained pore volume for the double gyroidal morphology and corresponded to porosities of 80% and 74%, respectively. As seen for the double gyroidal morphology, this high pore volume was almost exclusively constituted by the mesopores after carbonization at 1600° C. The micropore volume decreased by a factor of three upon pyrolysis at 1600° C. The pore size distribution, calculated using the BJH model for cylindrical pores, showed a broad peak centered at 35 nm, with higher peak area for the sample heat treated at 900° C., in agreement with the higher pore volume (FIG. 8C, inset). The pores of the single gyroidal carbon network do not exhibit cylindrical shape, as assumed in the BJH model, which can explain the large discrepancy between the pore size obtained from SEM image analysis and the BJH result.

Characterization of the Carbon Microstructure:

In order to investigate their composition, atomic structure, and degree of graphitization, the ordered mesoporous carbon materials reported here were characterized by X-ray photoelectron spectroscopy (XPS), high resolution XPS (HR-XPS), Raman spectroscopy, high resolution TEM (HR-TEM), wide angle X-ray diffraction (WAXD) and electron energy loss spectroscopy (EELS).

Figure 9:
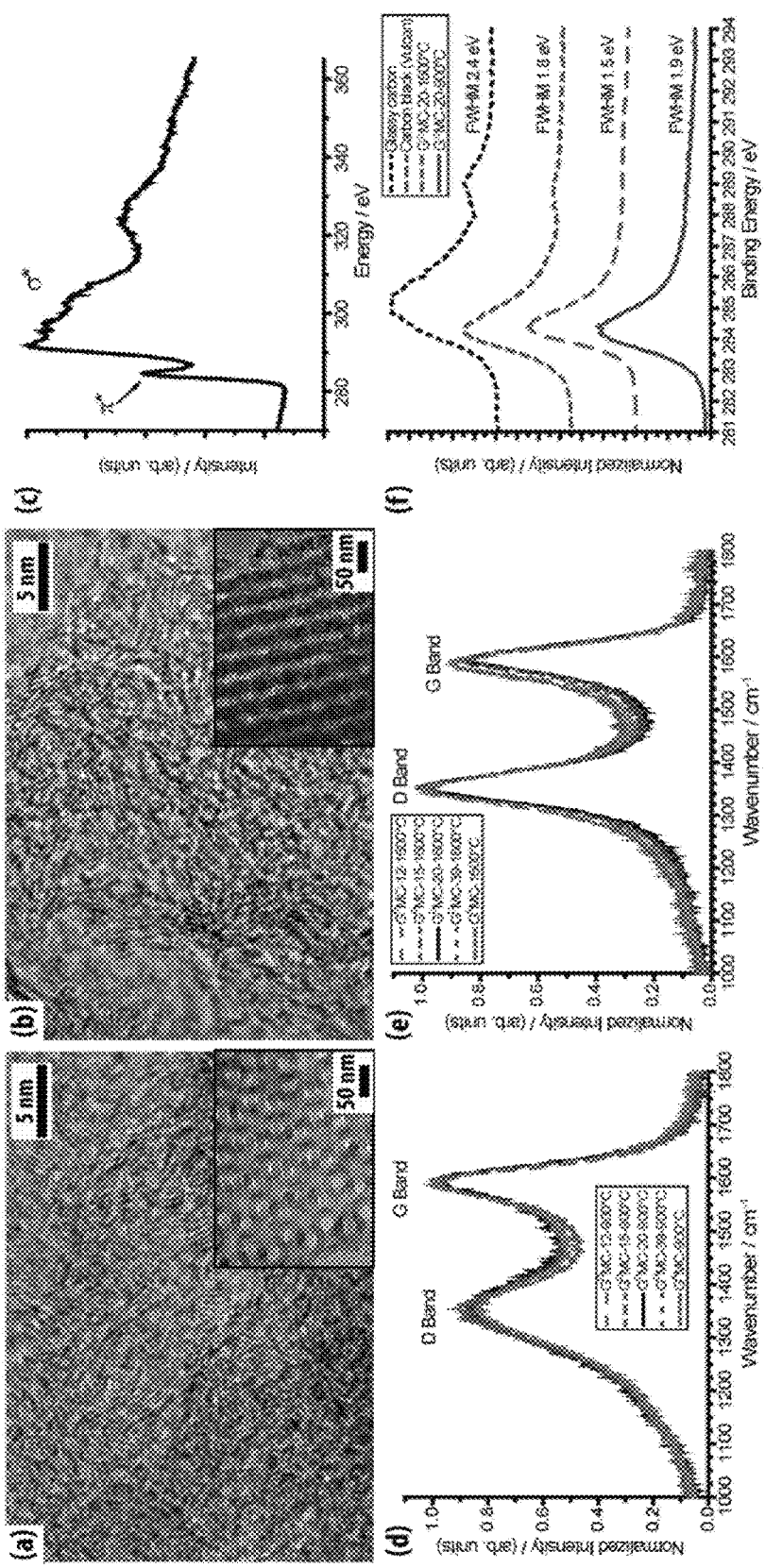
FIGS. 9A-9F: High-resolution transmission electron microscopy (HR-TEM) images of (A) $G^DMC\#2$-20-1600, and (B) $G^AMC\#5$-1600. Insets at a lower magnification of the same samples show the mesostructure. (C) Electron energy loss spectrum (EELS) of the carbon K-edge of $G^DMC\#2$-20-1600. The spectrum is an average of six area spectra (10×10 nm²) taken at different spots of the sample. Raman spectra of powders of double gyroidal mesoporous carbons pyrolyzed at (D) 900° C. and (E) 1600° C. showing the evolution of the D- and G-bands. (F) High resolution—X-ray photoelectron spectroscopy (HR-XPS) data of the carbon K-edge of $G^DMC\#2$-20-900, $G^DMC\#2$-20-1600, and for comparison glassy carbon as well as carbon black, showing the decrease of the peak width at higher carbonization temperatures.

XPS can be used to investigate the elemental composition of the top 1-10 nm of a material. Since our materials showed wall thicknesses of less than 20 nm, we assume that the resulting elemental composition is representative for our bulk material. The carbon materials heated to 900° C. showed oxygen contents of 10-20% which decreased to 7-16% for materials pyrolyzed at 1600° C. (Table 2). The oxygen content was most-likely due to hydroxyl groups on the carbon surface. In comparison, from XPS spectra of glassy carbon and carbon black (Vulcan X72) we calculated oxygen contents of 19% and 5%, respectively. The HR-XPS spectra of the carbon K-edge of $G^DMC\#2$-20 carbonized at 900° C. and 1600° C. are shown in FIG. 9F together with other carbon materials for comparison. HR-XPS showed one narrow peak centered at 284.4 eV, indicating that only one type of carbon was predominantly present. The full width at half maximum (FWHM) of this $G^DMC$ peak decreased with increasing carbonization temperature and was narrower than carbon black when pyrolyzed at 1600° C. Furthermore, the carbon K-edge in EELS showed the appearance of a pre-peak, that is due to the $\pi^*$-band, only present in $sp^2$-hybridized carbon materials (FIG. 9C). We concluded from the HR-XPS and EELS spectra that after carbonization at 1600° C., the carbon atoms in the structured mesoporous materials were almost entirely $sp^2$-hybridized.

Figure 14:
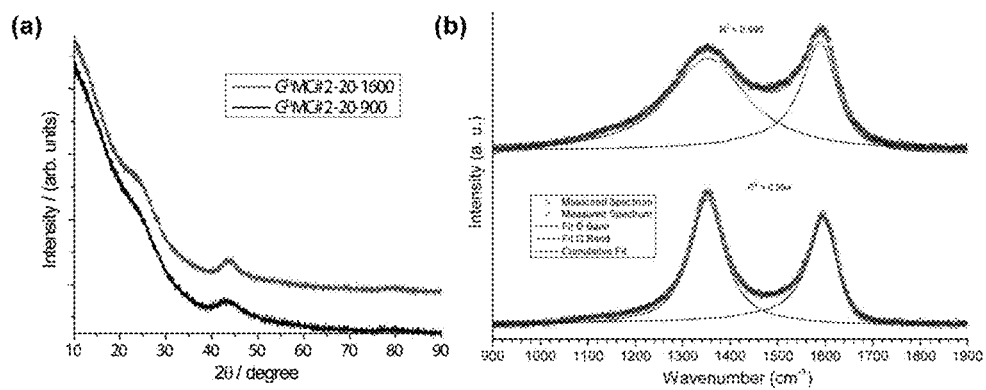

In order to determine the degree of graphitization, Raman spectroscopy as well as WAXD were applied to elucidate the in-plane size of the graphitic clusters and the number of stacked sheets, respectively. In Raman spectroscopy of disordered carbon materials, two bands, called the D- and the G-band, are typically observed at approximately 1350 $cm^{-1}$ and 1590 $cm^{-1}$, respectively. The G-band arises from the in-plane vibration of C=C double bonds, while the D-band is caused by a breathing mode of isolated benzene rings.[39] The Raman spectra of the $G^DMC$ materials heated to 900° C. and 1600° C. are displayed in FIGS. 9D and 9E, respectively. For the two temperatures, the D- and the G-band were clearly visible at 1352 $cm^{-1}$ and 1592 $cm^{-1}$ (900° C.) and 1352 $cm^{-1}$ and 1595 $cm^{-1}$ (1600° C.), indicating the presence of disordered carbon. For a given pyrolysis temperature, the different $G^DMC$ materials displayed identical Raman spectra irrespective of their pore size. Higher pyrolysis temperatures lead to narrower bands and increased the ratio of the integrated intensities of the G-band to the D-band suggesting a higher degree of graphitization for higher pyrolysis temperatures. Tuinstra and Koenig reported an empirical formula for the determination of the in-plane size of graphitic clusters based on the ratio of the G-band to the D-band (see SI).[39,40] Applying this formula, the in-plane size of the graphitic clusters was estimated to approximately 2.7 nm for the $G^DMC$-900 materials, and to approximately 3.7 nm for the $G^DMC$-1600 materials (Table 2), consistent with values reported in the literature on the pyrolysis of phenolic resins.[41] In WAXD measurements of graphitic materials, the peak at $2\theta=23$-$27°$ corresponds to the (200) plane of graphite. The position of the peak depends on the spacing between the graphene sheets ($2\theta=26.6°$ for graphite corresponding to 0.335 nm sheet spacing) and its FWHM gives information about the number of stacked graphene sheets. Measurements of the $G^DMC$ materials yielded diffractograms with poorly defined peaks at $2\theta=25°$ (FIG. 14). This indicated a small number of stacked graphene sheets, but made an analysis of the FWHM of the peak unreliable.

HR-TEM images of $G^DMC\#2$-20-1600 and $G^AMC$-1600 were consistent with the calculations from the Raman spectra (FIGS. 9A and 9B). Areas with four to eight parallel graphitic sheets of 3-5 nm length were observed. The orientation of the graphitic sheets in the different clusters was random and in no relationship to the features of the mesostructure, e.g. parallel or vertical to the pore wall. Additionally, curvature is evident in most of the graphitic sheets. The small cluster size, random orientation and varying curvature give rise to poor crystallographic long range order. The lack of long range order of more than a few nanometers is consistent with the poorly defined peaks observed in WAXD. Our analysis suggests that the microstructure of the gyroidal mesoporous carbons bears a strong resemblance to the microstructure of glassy carbon. The electrical conductivity of powdered gyroidal carbon materials was measured using a home-built four-point probe apparatus with uni-axial applied pressure of 250 psi as described in detail before.[42] The conductivities of $G^DMC\#2$-20-900 and $G^DMC\#2$-20-1600 were 0.1 S $cm^{-1}$ and 2.1 S $cm^{-1}$, respectively, which makes our high temperature treated gyroidal mesoporous carbon comparable to Carbon Black (Vulcan XC72) with a measured conductivity of 4.2 S $cm^{-1}$ under the same conditions.

Figure 15:
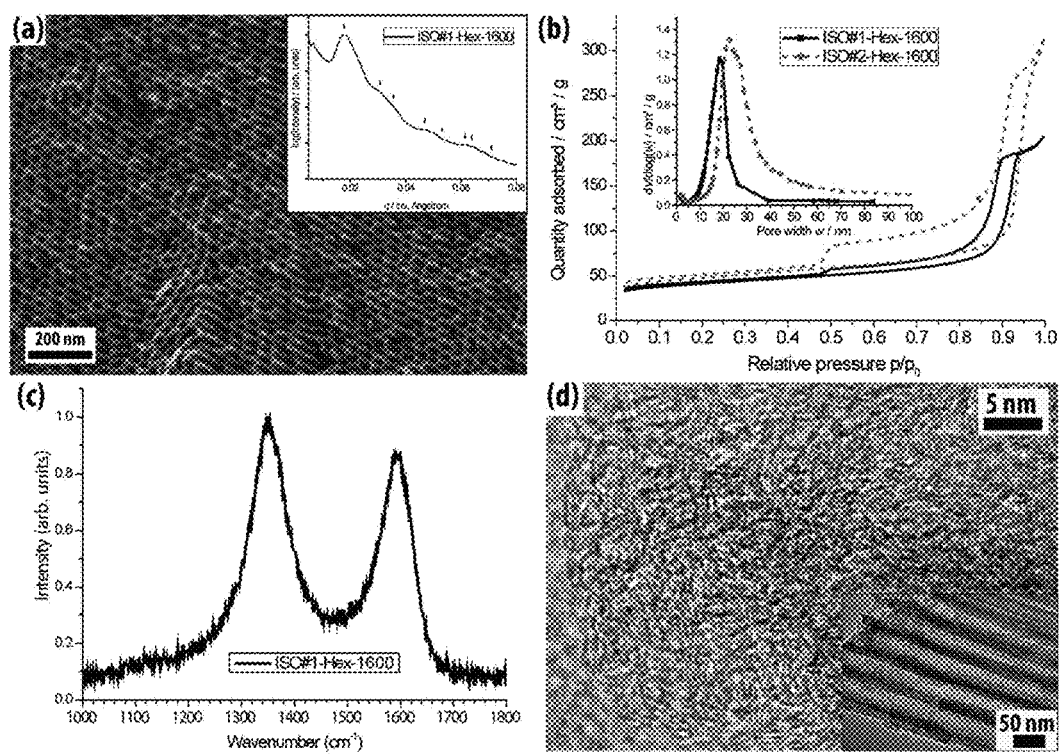

In order to elucidate the influence of the morphology on the graphitic cluster size, we investigated carbon materials from hybrids with hexagonally packed cylindrical morphology (see Example 2). Hybrids using ISO#1 and ISO#2 formed an inverse hexagonally packed cylindrical morphology at resols:ISO loadings up to 1.2:1 (FIG. 15A). The materials showed similar Raman spectra as the gyroidal mesoporous carbons (FIG. 15C). HR-TEM images also suggested randomly oriented graphitic clusters with the same apparent size and curvature as in the gyroidal materials (FIG. 15D). This result suggests that for the present terpolymer derived carbons, there is no relationship between the carbon micro- and mesostructure. Formation of a well defined hexagonally oriented cylindrical morphology at higher resols loadings demonstrated further structural tunability of mesoporous carbons via our synthesis procedure.

Figure 10:
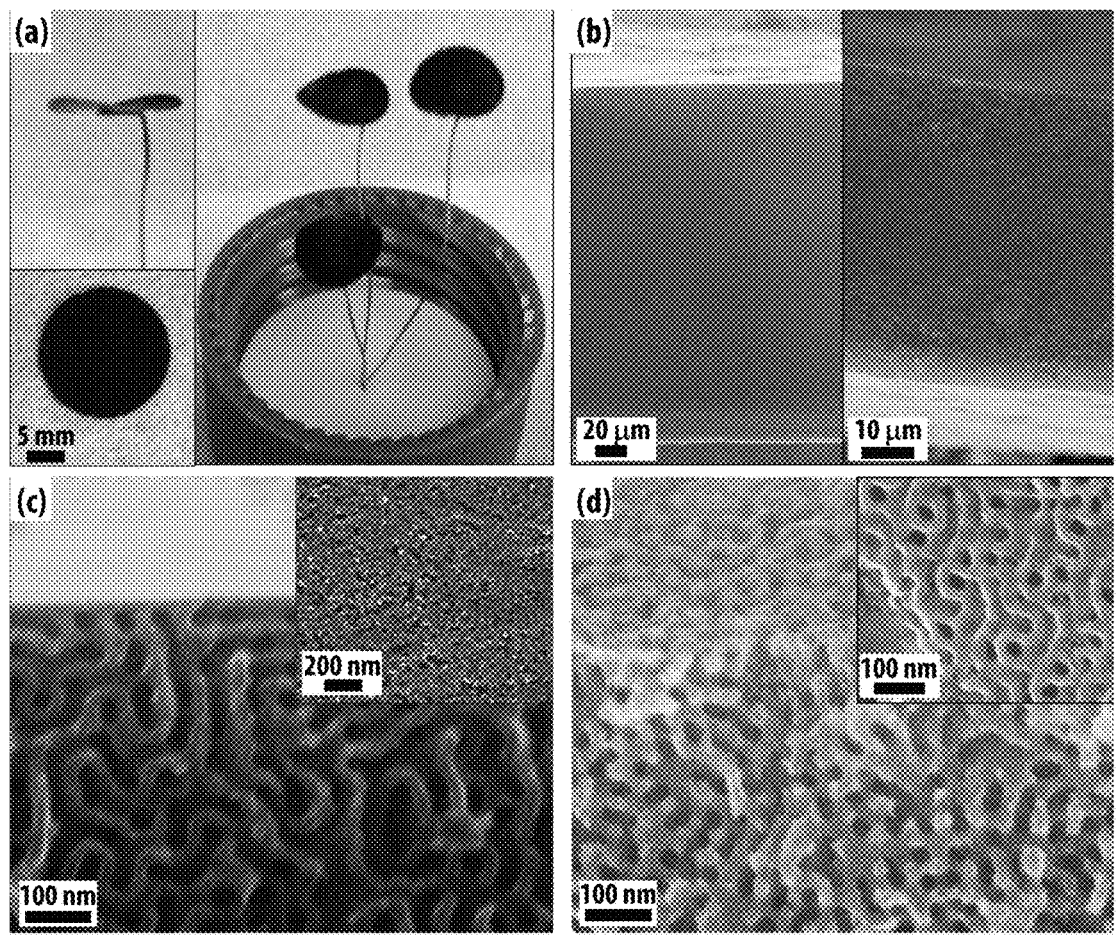
FIGS. 10A-10D: (A) Photographs of $G^DMC\#3$-39-1200 films from the top (bottom left) and conductively connected to silver wires (top left and right). Cross sectional SEM images of $G^DMC\#3$-39-1200 monoliths of (B, left) 200 µm and (b, right) 50 µm thickness; higher magnification images at the edge of the surface (C) unexposed and (D) exposed to prior plasma treatment of the organic-organic hybrid. The insets in (C) and (D) show SEM images of the top surfaces only.

Monolithic Gyroidal Mesoporous Carbon:

Following our synthesis strategy, we were able to synthesize monolithic gyroidal mesoporous carbons ($mG^DMC$) with tailored macroscopic dimensions. As-cast, annealed organic-organic hybrid films were flexible and therefore could be cut or punched into the desired shape (FIG. 10A). After carbonization at temperatures up to 1600° C., the monoliths retained their macroscopic appearance (FIG. 10A). The large mesostructural shrinkage of 30% during heat treatment was translated into a macroscopic shrinkage of the monoliths (e.g. a hybrid disc of 10 mm diameter yielded a gyroidal carbon monolith of 7 mm diameter, FIG.

10A). Considering this large shrinkage, it was surprising that the monoliths kept their structural integrity without cracking or pulverizing. Furthermore, by altering the amount of material per casting area, we were able to tailor the monolith thickness from over 200 µm to less than 50 µm, a thickness ideally suited for electrode applications (FIG. 10B). The remarkable macrostructure preservation for different monolith sizes demonstrated the high versatility of our process. We attribute the macroscopic stability of the materials at high temperatures to the wall thickness of more than 10 nm as well as the bicontinuous mesostructure that allowed isotropic strain release during the shrinkage and assured sufficient release of the decomposition gases without building up of pressure inside the material that would cause cracking of the monolith. To the best of our knowledge this is the first report of silica-free, soft-templated ordered mesoporous carbon monoliths without macropores.

Moreover, we developed a procedure to fabricate monoliths with structured surfaces that show narrow pore size distributions (FIGS. 10C and 10D). A common problem with continuous films of mesostructured materials obtained by soft templating is the orientation of the pores and an unstructured or closed surface layer on the top and bottom of the film (see FIG. 10C, inset and FIG. 11D) due to lamellar capping layers.[14,30] This is caused by the different surface energies of the various block copolymer domains during the casting process. Due to the bicontinuous nature of the cubic, gyroidal morphology, the orientation of the structure with respect to the surfaces is irrelevant. By oxygen/argon plasma etching of the organic-organic hybrid monoliths, the lamellar capping layers could be removed and the gyroidal bulk structure became directly accessible from the surface (see FIG. 10D and inset). After carbonization at temperatures as high as 1600° C., the surface showed gyroidal features, assuring a narrow pore size distribution also at the surface. The pores on the surface are slightly smaller according to SEM image analysis compared to the interior gyroidal porosity, however, most likely due to condensation of the polymeric materials on the surface during plasma treatment. Additionally, this simple process allows for selective exposure of only a fraction of the surface to the plasma, hence leading to a tailored opening of surface sites. For example, we covered one surface of a hybrid film during plasma treatment, which led to a carbon monolith with one closed surface and one ordered, porous surface (similar to FIGS. 10C and 10D, respectively). Furthermore, this opened up the possibility of conductively connecting the monolith with silver or carbon paste on the closed side, making the monolith accessible for further electrochemical treatments, without the risk of the required binder to infiltrate the pores and, as a result, distort the measurements.

Conclusion

In this Example 1, we have demonstrated the metal- and halogen-free synthesis of highly ordered double gyroidal mesoporous carbons, with tailored pore sizes of up to 39 nm, the largest reported pore size for soft-templated OMCs to date. By modification of the carbon precursor, to the best of our knowledge for the first time we synthesized single gyroidal carbon networks form organic-organic hybrids with alternating gyroid morphology. Through the rational design of the triblock terpolymers, we show high tunability of the porosity between 32-80 vol % combined with structural stability up to 1600° C., unprecedented for soft-templated ordered mesoporous materials, ensuring a high degree of $sp^2$-hybridization and low microporosity with a glassy carbon-like microstructure. Finally, we demonstrated the first silica-free soft-templating process to fabricate monolithic gyroidal mesoporous carbons with tailored macroscopic shape, and accessible surface pores through plasma treatment of the organic-organic hybrids before carbonization.

Since all the microstructural characteristics of the four reported double gyroidal mesoporous carbons are very similar to each other, this system is ideal for studies of the pore size dependence of the performance of such mesoporous carbon electrodes in energy technology or catalysis. Furthermore, the large and uniform pore size together with pore interconnectivity and the ability of making tailored monolithic materials thereof open up new possibilities for the fabrication of functional multi-component composites on the nanoscale, as illustrated on the right of FIG. 4.

Example 2

Supporting Experimental Results

Synthesis and Characterization of Gyroidal Mesoporous Carbons and Carbon Monoliths with Tunable Ultralarge Pore Size In support of the experiments set forth in Example 1, further electron microscopy, nitrogen sorption and X-ray scattering analysis is provided below. For example, a detailed description of the Raman analysis and the characterization data of inverse hexagonally packed carbon cylinders are provided.

Raman Spectroscopy:

Raman spectra of the powdered carbons were measured at an excitation wavelength of 488 nm on a Renishaw InVia microRaman system equipped with a 50× objective with a numerical aperture of 0.45. Five spectra at different spots were measured for each sample.

The in plane graphitic cluster size, $L_a$, of the gyroidal mesoporous carbons was calculated using the empirical equation by Tuinstra and Koenig:[39,40]

$$L_a = 43.9 \cdot \left(\frac{I_D}{I_G}\right)^{-1}$$

yielding the in plane graphitic cluster size, $L_a$, in Ångstrom. For this purpose, the spectra were fitted between 900 cm$^{-1}$ and 1900 cm$^{-1}$ using two peaks, a Lorentz line for the D band and a Breit-Wigner-Fano line for the G band. For the calculation of $L_a$, integrated intensities, $I_D$ and $I_G$, of the peaks were employed. The reported values of $L_a$ represent the mean value obtained from five spectra of the respective carbon with a confidence interval of 95%. Representative spectra with the corresponding peak fitting of gyroidal mesoporous carbons heated to 900° C. and 1600° C. are shown in FIG. 14B.

Hexagonally Oriented Cylindrical Carbon Morphology:

For resols loadings in ISO#1 and ISO#2 organic-organic hybrids above the double gyroid window, hybrid characterization results suggested a core-shell hexagonally oriented cylindrical morphology, designated as ISO#X-Hex-Y where X stands for the ISO used and Y represents the highest temperature at which the material was heat treated. In this morphology, the hydrophilic PEO-resols phase forms the matrix around hexagonally packed poly(styrene)-block-poly (isoprene) core-shell cylinders. After decomposition of the structure directing triblock terpolymer and carbonization of the resols, the cylinders constitute one dimensional pores. The well ordered structure can be seen in the SEM images in FIG. 15A. Nitrogen sorption revealed BET surface areas of 145 m$^2$ g$^{-1}$ and 167 m$^2$ g$^{-1}$ and micropore surface areas of 77 m$^2$ g$^{-1}$ and 67 m$^2$ g$^{-1}$ for ISO#1-Hex-1600 and ISO#2-Hex-1600, respectively. The pore volumes shrank, compared to the double gyroidal carbon materials from the respective polymers, to 0.30 cm$^3$ g$^{-1}$ and 0.46 cm$^3$ g$^{-1}$ for ISO#1-Hex-1600 and ISO#2-Hex-1600, respectively, due to the higher resols to ISO ratio of 1.1:1 and 1.2:1. Microstructural analysis of the hexagonal carbon materials showed very similar results to the gyroidal carbon materials. The Raman spectrum for ISO#1-Hex-1600 is shown in FIG. 15C and is similar to those of the G$^D$MCs. High resolution transmission electron microscopy revealed graphitic clusters of 3-8 stacked graphitic sheets with up to 7 nm length that are randomly oriented and slightly bent (FIG. 15D). This suggests that the mesostructure as well as the resols density in the hydrophilic PEO-resol phase does not influence the microstructure of the resulting carbon material.

Example 3

Activation of Gyroidal Mesoporous Carbons with Carbon Dioxide

For many applications surface area is an important characteristic of porous materials. In energy storage for example, high surface area is desirable in high rate (high power) electrodes like supercapacitors. In electrochemical double layer capacitors (EDLC), the energy is stored only at the electrode-electrolyte interface, which makes it accessible very fast. The higher the surface area, the more energy can be stored in an EDLC. In contrast, in battery electrodes high surface areas typically increase undesirable side reactions at the solid electrolyte interface (SEI). But since small materials dimensions are necessary for fast ion insertion, an optimal surface to volume ratio for electrode materials has to be found. Therefore, controlling the surface area and volume to surface ratio is crucial in porous materials such as the gyroidal mesoporous carbons (GMCs) reported here. High temperature treatment of carbon materials leads to high degrees of condensation diminishing the amount of micropores and their contribution to surface area. The GMCs are structurally stable at temperatures up to 1600° C. thus yielding materials with surface area and porosity dominated mainly by mesoporosity. This porosity characteristic is ideal for battery applications. In order to increase the surface area for applications such as EDLCs, carbon activation experiments have been performed.

Figure 16:
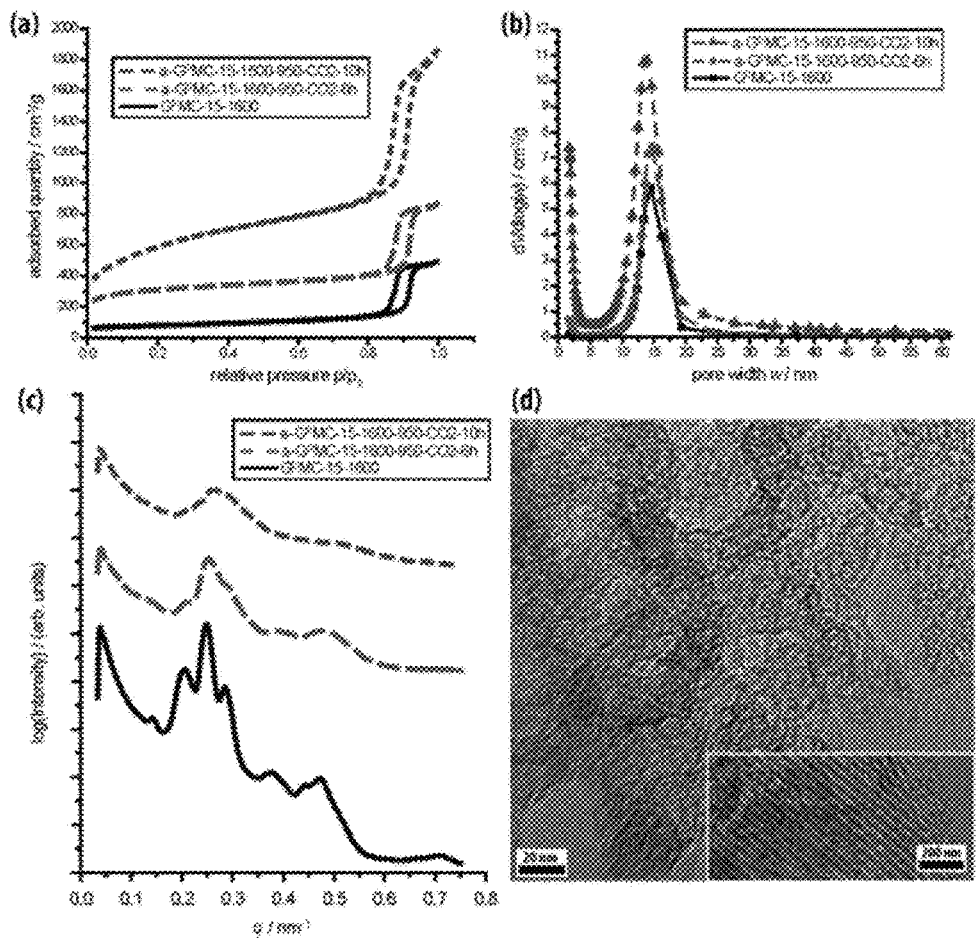

We employed the carbon dioxide ($CO_2$) activation method with a flow rate of 1 cm$^3$ min$^{-1}$ at a temperature of 950° C. to increase surface area. At temperatures above 900° C., $CO_2$ is in equilibrium with CO and slowly oxidizes carbon materials. Varying the length the material was exposed to the oxidizing gas enabled tuning of surface area and microporosity. Interestingly, the underlying cubic gyroidal mesostructure and porosity was not completely destroyed, even after extended activation times as long as 10 hours (FIGS. 16C and 16D). After 6 and 10 hours of activation, G$^D$MC-15-1600 showed an increase of total surface area from originally 318 m$^2$ g$^{-1}$ to 1076 m$^2$ g$^{-1}$ and 2125 m$^2$ g$^{-1}$, respectively, with a respective weight loss of 26 and 78 wt % (FIG. 16A, Table 3).

TABLE 3

Summary of nitrogen sorption analysis results on activated G$^D$MC-15-1600.

| Activation time/ hours | Weight loss | BET surface area/ m$^2$ g$^{-1}$ | micropore surface area/ m$^2$ g$^{-1}$ | Pore volume/ cm$^3$ g$^{-1}$ | Micropore volume/ cm$^3$ g$^{-1}$ |
|---|---|---|---|---|---|
| 0 hours | — | 318 | 136 | 0.79 | 0.06 |
| 6 hours | 26.1 wt % | 1076 | 611 | 1.05 | 0.28 |
| 10 hours | 78.3 wt % | 2125 | 314 | 3.24 | 0.11 |

For the shorter activation time of 6 hours, micropores were introduced into the gyroidal carbon walls leading to an increase in micropore surface area from originally 136 m$^2$ g$^{-1}$ to 611 m$^2$ g$^{-1}$. For continued activation of up to 10 hours the micropore surface area decreased again to 314 m$^2$ g$^{-1}$ with a slight decrease of the mesopore size from 15 to 14 nm (FIG. 16B). The same trend was observed for pore volume. The total pore volume increased from originally 0.79 cm$^3$ g$^{-1}$ for the non-activated G$^D$MC-15-1600 to 1.05 and then to 3.24 cm$^3$ g$^{-1}$, for 6 and 10 hour activations, respectively, while the micropore volume first increased from originally 0.06 cm$^3$ g$^{-1}$ to 0.28 cm$^3$ g$^{-1}$ after 6 hours, and then decreased again to 0.11 cm$^3$ g$^{-1}$ after 10 hours of activation. We hypothesize that the substantial oxidation of the carbon walls with a weight loss of 78 wt % caused a high degree of surface roughening (FIG. 16D) and minor structural shrinkage. Especially for the 10 hours long activation many micropores grew to diameters above 2 nm (FIG. 16B, blue trace), thus falling out of the range of micropores and not contributing to micropore volume, but substantially contributing to overall porosity, consistent with the observed trends. It is astonishing that despite this massive weight loss as a result of the harsh $CO_2$ treatment the cubic mesostructure is still retained. This is suggested from TEM investigations as well as the appearance of, albeit with significant line broadening, small-angle X-ray scattering (SAXS) peaks at the positions of the original, non-activated material, G$^D$MC-15-1600.

Example 4

Doping and Nanocomposites of Gyroidal Mesoporous Carbon

Introduction of trace elements is broadly employed to alter the performance characteristics of materials. This has been intensively studied in the field of semiconductor conductivity, where for example the kind and the amount of charge carriers can be varied through the introduction of trace doping elements. The introduction of dopants such as boron or nitrogen into carbon materials has also been shown to change conductivity or introduce functional sites that can increase catalytic activity or charge capacity. Adding higher amounts of materials in the form of e.g. nanoparticles is another way of changing characteristics such as catalytic activity in the resulting multicomponent nanocomposites.

Here we report a simple alteration of the procedure described above for the synthesis of doped gyroidal mesoporous carbons and metal nanoparticle-gyroidal mesoporous carbon nanocomposites. When a dopant or metal containing reagent is dissolved in the solution of the triblock terpolymer ISO with the carbon precursors, phenol/formaldehyde resols, without reacting with any of the components, it incorporates into the ordered gyroidal organic-organic hybrid. These reagents include, but are not limited to, benzene diboronic acid for boron doping of the carbon microstructure and dimethyl cylcooctadienyl platinum for the formation of a platinum nanoparticle—gyroidal mesoporous carbon nanocomposite. This simple one pot procedure requires no additional synthesis step for the fabrication of above described materials.

Figure 17:
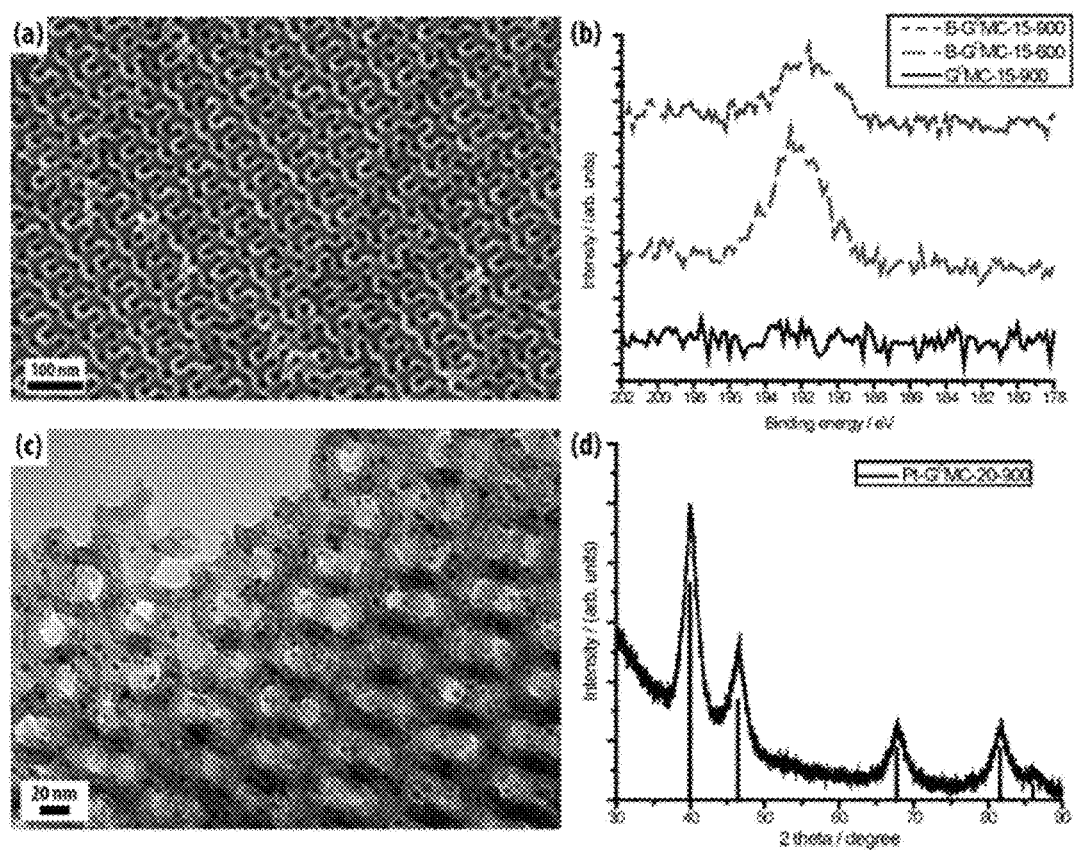

The doping of $G^DMC$-15 with a small amount of boron was confirmed by high resolution-X-ray photoelectron spectroscopy (HR-XPS). The peak associated with the boron-1s electron at 192 eV was detected after the boron precursor containing organic-organic hybrid was pyrolized at 600° C. and 900° C. under full retention of the structure (FIGS. 17A and 17B). An elemental quantification of the material heat treated at 600° C. resulted in a carbon:oxygen:boron ratio of 79:20:1. It is worth noting that due to the small absorption cross-section of boron, this quantification is associated with a large error. However, the appearance of the boron-1s peak clearly indicates the successful doping of the carbon with boron.

A metal precursor such as dimethyl cylcooctadienyl platinum added to the casting solution incorporates into the hydrophobic phase of the organic-organic hybrid after solvent evaporation. During pyrolysis, the decomposing triblock terpolymer ISO and the carbon precursor reduce the metal precursor to form metal nanoparticles. The formation of small platinum nanoparticles in $G^DMC$-20 was evidenced by transmission electron microscopy (TEM) and X-ray diffraction (XRD) (FIGS. 17C and 17D). The TEM image shows well dispersed nanoparticles with a size of less than 7 nm in the double gyroidal mesoporous carbon matrix after pyrolysis at 900° C. The XRD pattern shows broad peaks at the angular positions expected for platinum metal. Analysis of the four main diffraction peaks according to the Scherer equation suggests an average crystallite size of 4 nm. These results together with the results on boron doping demonstrate the versatility and robustness of the gyroidal mesoporous carbon formation with respect to soluble additives as well as impurities.

REFERENCES

Citation of a reference herein shall not be construed as an admission that such reference is prior art to the present invention. All references cited herein are hereby incorporated by reference in their entirety. Certain references are cited by author and date, while other references are denoted by superscripted numerals. Below is a listing of various references cited as superscripted numerals herein, with the references being identified by author, title, date, publication, and page numbers:

1. Bansal, R. C.; Donnet, J. B.; Stoeckli, F.; *Active Carbon*, Marcel Dekker, New York, 1988.
2. Yang, R. T.; *Adsorbents: Fundamentals and Applications*, Wiley-Interscience, New York, 2003.
3. Gaffney, T. R., Porous Solids for Air Separation. *Curr. Opin. Solid State Mater. Sci.* 1996, 1, 69-75.
4. Ryoo, R.; Joo, S. H.; Jun, S., Synthesis of Highly Ordered Carbon Molecular Sieves via Template-Mediated Structural Transformation. *J. Phys. Chem. B* 1999, 103, 7743-7746.
5. Lee, J.; Yoon, S.; Hyeon, T.; Oh, S. M.; Kim, K. B., Synthesis of a New Mesoporous Carbon and its Application to Electrochemical Double-Layer Capacitors. *Chem. Commun.* 1999, 2177-2178.
6. Tian, B. Z.; Che, S. N.; Liu, Z.; Liu, X. Y.; Fan, W. B.; Tatsumi, T.; Terasaki, O.; Zhao, D. Y., Novel Approaches to Synthesize Self-Supported Ultrahin Carbon Nanowire Arrays Templated By MCM-41. *Chem. Commun.* 2003, 2726-2727.
7. Jun, S.; Joo, S. H.; Ryoo, R.; Kruk, M.; Jaroniec, M.; Liu, Z.; Ohsuna, T.; Terasaki, O., Synthesis of New, Nanoporous Carbon with Hexagonally Ordered Mesostructure. *J. Am. Chem. Soc.* 2000, 122, 10712-10713.
8. Che, S. N.; Garcia-Bennett, A. E.; Liu, X. Y.; Hodgkins, R. P.; Wright, P. A.; Zhao, D. Y.; Terasaki, O.; Tatsumi, T., Synthesis of Large-Pore Ia3d Mesoporous Silica and its Tubelike Carbon Replica. *Angew. Chem., Int. Ed.* 2003, 42, 3930-3934.
9. Liu, X. Y.; Tian, B. Z.; Yu, C. Z.; Gao, F.; Xie, S. H.; Tu, B.; Che, R. C.; Peng, L. M.; Zhao, D. Y., Room-Temperature Synthesis in Acidic Media of Large-Pore Three-Dimensional Bicontinuous Mesoporous Silica with Ia3d symmetry. *Angew. Chem., Int. Ed.* 2002, 41, 3876-3878.
10. Kleitz, F.; Choi, S. H.; Ryoo, R., Cubic Ia3d Large Mesoporous Silica: Synthesis and Replication to Platinum Nanowires, Carbon Nanorods and Carbon Nanotubes. *Chem. Commun.* 2003, 2136-2137.
11. Kim, T. W.; Kleitz, F.; Paul, B.; Ryoo, R., MCM-48-Like Large Mesoporous Silicas With Tailored Pore Structure: Facile Synthesis Domain in a Ternary Triblock Copolymer-Butanol-Water System. *J. Am. Chem. Soc.* 2005, 127, 7601-7610.
12. Yang, H. F.; Shi, Q. H.; Liu, X. Y.; Xie, S. H.; Jiang, D. C.; Zhang, F. Q.; Yu, C. Z.; Tu, B.; Zhao, D. Y., Synthesis of Ordered Mesoporous Carbon Monoliths with Bicontinuous Cubic Pore Structure of Ia3d Symmetry. *Chem. Commun.* 2002, 2842-2843.
13. Liang, C. D.; Hong, K. L.; Mays, J. W.; Dai, S., Synthesis of a Large-Scale Highly Ordered Porous Carbon Film By Self-Assembly of Block Copolymers. *Angew. Chem., Int. Ed.* 2004, 43, 5785-5789.
14. Tanaka, S.; Nishiyama, N.; Egashira, Y.; Ueyama, K., Synthesis of Ordered Mesoporous Carbons with Channel Structure From an Organic-Organic Nanocomposite. *Chem. Commun.* 2005, 2125-2127.
15. Meng, Y.; Gu, D.; Zhang, F. Q.; Shi, Y. F.; Cheng, L.; Feng, D.; Wu, Z. X.; Chen, Z. X.; Wan, Y.; Stein, A. et al., A Family of Highly Ordered Mesoporous Polymer Resin and Carbon Structures from Organic—Organic Self-Assembly. *Chem. Mater.* 2006, 18, 4447-4464.
16. Liu, L. W.; Wang, F.-Y.; Shao, G.-S.; Ma, T.-Y.; Zhong, Z.-Y., Synthesis of Ultra-Large Mesoporous Carbons from Triblock Copolymers and Phloroglucinol/Formaldehyde Polymer. *Carbon* 2010, 9, 2660-2664.
17. Fulvio, P. F.; Mayes, R. T.; Wang, X.; Mahurin, S. M.; Bauer, J. C.; Presser, V.; McDonough, J.; Gogotsi, Y.; Dai, S., "Brick-and-Mortar" Self-Assembly Approach to Graphitic Mesoporous Carbon Nanocomposites. *Adv. Funct. Mater.* 2011, 21, 2208-2215.
18. Kosonen, H.; Valkama, S.; Nykanen, A.; Toivanen, M.; ten Brinke, G.; Ruokolainen, J.; Ikkala, O., Functional Porous Structures Based on the Pyrolysis of Cured Templates of Block Copolymer and Phenolic Resin. *Adv. Mater.* 2006, 18, 201-205.
19. Deng, Y.; Yu, R.; Wan, X.; Shi, Y.; Meng, Y.; Gu, D.; Zhang, L.; Huang, Y.; Liu, C.; Wu, X. et al., Ordered Mesoporous Silicas and Carbons with Large Accessible Pores Templated From Amphiphilic Diblock Copolymer Poly(Ethylene Oxide)-b-Polystyrene. *J. Am. Chem. Soc.* 2007, 129, 1690-1697.
20. Zhang, J.; Deng, Y.; Wei, J.; Sun, Z.; Gu, D.; Bongard, H.; Liu, C.; Wu, H.; Tu, B.; Schüth, F. et al., Design of Amphiphilic ABC Triblock Copolymer for Templating Synthesis of Large-Pore Ordered Mesoporous Carbons with Tunable Pore Wall Thickness. *Chem. Mater.* 2009, 21, 3996-4005.
21. Wei, J.; Deng, Y.; Zhang, J.; Sun, Z.; Tu, B.; Zhao, D. Y., Large-Pore Ordered Mesoporous Carbons with Tunable Structures and Pore Sizes Templated from Poly(Ethylene Oxide)-b-Poly(Methyl Methacrylate). *Solid State Sci.* 2011, 13, 784-792.
22. Li, J.-G.; Lin, Y.-D.; Kuo, S.-W., From Microphase Separation to Self-Organized Mesoporous Phenolic Resin through Competitive Hydrogen Bonding with Double-Crystalline Diblock Copolymers of Poly(Ethylene Oxide-b-ε-Caprolactone). *Macromolecules* 2011, 44, 9295-9309.
23. Deng, Y.; Liu, J.; Liu, C.; Gu, D.; Sun, Z.; Wei, J.; Zhang, J.; Zhang, L.; Tu, B.; Zhao, D. Y., Ultra-Large-Pore Mesoporous Carbons Templated from Poly(ethylene oxide)-b-Polystyrene Diblock Copolymer by Adding Polystyrene Homopolymer as a Pore Expander. *Chem. Mater.* 2008, 20, 7281-7286.
24. Wang, X.; Liang, C.; Dai, S., Facile Synthesis of Ordered Mesoporous Carbons with High Thermal Stability by Self-Assembly of Resorcinol-Formaldehyde and Block Copolymers Under Highly Acidic Conditions. *Langmuir* 2008, 24, 7500-7505.
25. Huang, Y.; Cai, H. Q.; Feng, D.; Gu, D.; Deng, Y. H.; Tu, B.; Wang, H. T.; Webley P. A.; Zhao, D. Y., One-Step Hydrothermal Synthesis of Ordered Mesostructured Carbonaceous Monoliths with Hierarchical Porosities. *Chem. Commun.* 2008, 2641-2643.
26. Liang, C. D.; Dai, S., Dual Phase Separation for Synthesis of Bimodal Meso-/Macroporous Carbon Monoliths. *Chem. Mater.* 2009, 21, 2115-2124.
27. Mayes, R. T.; Tsouris, C.; Kiggans, J. O.; Mahurin, S. M.; DePaoli, D. W.; Dai, S., Hierarchical Ordered Mesoporous Carbon from Phloroglucinol-Glyoxal and its Applications in Capacitive Deionization of Brakish Water. *J. Mater. Chem.* 2010, 20, 8674-8678.
28. Hao, G. P.; Li, W. C.; Qian, D.; Wang, G. H.; Zhang, W. P.; Zhang, T.; Wang, A. Q.; Schüth, F.; Bongard, H. J.; Lu, A. H., Structurally Designed Synthesis of Mechanically Stable Poly(Benzoxazine-co-Resol)-Based Porous Carbon Monoliths and Their Application as High-Performance $CO_2$ Capture Sorbents. *J. Am. Chem. Soc.* 2011, 133, 11378-11388.
29. Hao, G. P.; Li, W. C.; Wang, S. A.; Wang, G. H.; Qi, L.; Lu, A. H., Lysine-Assisted Rapid Synthesis of Crack-Free Hierarchical Carbon Monoliths with a Hexagonal Array of Mesopores. *Carbon* 2011, 49, 3762-3772.
30. Wei, H.; Lv, Y.; Han, L.; Tu, B.; Zhao, D. Y., Facile Synthesis of Transparent Mesostructured Composites and Corresponding Crack-free Mesoporous Carbon/Silica Monoliths. *Chem. Mater.* 2011, 23, 2353-2360.
31. Stefik, M.; Wang, S.; Hoyden, R.; Sai, H.; Tate, M. W.; Muller, D. A.; Steiner, U.; Gruner, S. M.; Wiesner, U., Networked and Chiral Nanocomposites from ABC Triblock Terpolymer Coassembly with Transition Metal Oxide Nanoparticles. *J. Mater. Chem.*, 2012, 22, 1078-1087.
32. Bailey, T. S.; Hardy, C. M.; Epps, T. H.; Bates, F. S., A Noncubic Triply Periodic Network Morphology in Poly (Isoprene-b-Styrene-b-Ethylene Oxide) Triblock Copolymers. *Macromolecules* 2002, 35, 7007-7017.
33. Florent, M.; Xue, C.; Zhao, D. Y.; Goldfarb, D., Formation Mechanism of Cubic Mesoporous Carbon Monolith Synthesized by Evaporation-Induced Self-assembly. *Chem. Mater.* 2012, 24, 383-392.
34. Gregg, S. J.; Sing, K. S. W., *Adsorption, Surface Area and Porosity*, $2^{nd}$ Edition, Academic Press, London 1982.
35. Barrett, E. P.; Joyner, L. G.; Halenda, P. P., The Determination of Pore Volume and Area Distributions in Porous Substances. *J. Am. Chem. Soc.* 1951, 73, 373-380.
36. Toombes, G.; Finnefrock, A.; Tate, M. W.; Ulrich, R.; Wiesner, U.; Gruner, S., A Re-Evaluation of the Morphology of a Bicontinuous Block Copolymer—Ceramic Material. *Macromolecules* 2007, 40, 8974-8982.
37. Epps, T. H.; Cochran, E. W.; Bailey, T. S.; Waletzko, R. S.; Hardy, C. M.; Bates, F. S., Ordered Network Phases in Linear Poly(Isoprene-b-Styrene-b-Ethylene Oxide) Triblock Copolymers. *Macromolecules* 2004, 37, 8325-8341.
38. Leibler, L., Theory of Microphase Separation in Block Copolymers. *Macromolecules* 1980, 13, 1602-1617.
39. Ferrari, A. C.; Robertston, J., Interpretation of Raman Spectra of Disordered and Amorphous Carbon. *Phys. Rev. B* 2000, 61, 14095-14107.
40. Tuinstra, F.; Koenig, J. L., Raman Spectrum of Graphite. *J. Chem. Phys.* 1970, 53, 1126-1130.
41. Ko, T.-H.; Kuo, W.-S.; Chang, Y.-H., Raman Study of the Microstructure Changes of Phenolic Resin During Pyrolysis. *Polym. Compos.* 2000, 21, 745-750.
42. Subban, C. V.; Smith, I. C.; DiSalvo, F. J., Interconversion of Inverse Opals of Electrically Conducting Doped Titanium Oxides and Nitrides. *Small* 2012, 8, 2824-2832.

While several aspects of the present invention have been described and depicted herein, alternative aspects may be affected by those skilled in the art to accomplish the same objectives. Accordingly, it is intended by the appended claims to cover all such alternative aspects as fall within the true spirit and scope of the invention.

What is claimed is:

1. A mesoporous carbon composition comprising:
   a carbonized gyroidal mesoporous carbon comprising monolithic ordered gyroidal triblock terpolymer-directed structure and mesopores having a pore size of greater than 11 nanometers (nm) in diameter,
   wherein long range order of the ordered gyroidal triblock terpolymer-directed structure is thermally stable at least at temperatures up to 1600° C.

2. The composition according to claim 1, wherein the gyroidal mesoporous carbon has a porosity of between about 30 and about 80 volume percent (vol %).

3. The composition according to claim 1, wherein the gyroidal mesoporous carbon has a pore volume of between about 0.25 and about 2.0 $cm^3$ $g^{-1}$.

4. The composition according to claim 1, wherein the mesopores have a pore size of between 12 nm and 50 nm in diameter.

5. The composition according to claim 1, wherein the ordered gyroidal triblock terpolymer-directed structure comprises a double gyroidal mesoporous carbon morphology, a single gyroidal mesoporous carbon morphology, a monolithic gyroidal mesoporous carbon morphology, or combinations thereof.

6. The composition according to claim 1, wherein the gyroidal mesoporous carbon further comprises nanopores to provide increased surface area.

7. The composition according to claim 1 further comprising a dopant or a nanoparticulate.

8. The composition according to claim 7, wherein the dopant is selected from the group consisting of boron, nitrogen, sulfur, phosphorous, arsenic, antimony, oxygen, selenium, and tellurium.

9. The composition according to claim 7, wherein the nanoparticulate is selected from the group consisting of platinum, metals, metal alloys, intermetallics, metal oxides, and silicon oxides.

10. The composition according to claim 1, wherein the composition is in the form of a film or a powder.

11. An electrode material comprising a composition according to claim 1.

12. A fuel cell, battery, supercapacitor, capacitive desalination membrane, energy storage device, or energy conversion device comprising the electrode material according to claim 11.

13. A method of making a mesoporous carbon composition comprising a carbonized gyroidal mesoporous carbon, said method comprising:
    combining a carbon precursor and a structure-directing triblock terpolymer to yield a self-assembled precursor/terpolymer composite having an ordered gyroidal structure that is defined by the triblock terpolymer and the ratio of the triblock terpolymer to the carbon precursor; and
    treating the precursor/terpolymer composite to remove the triblock terpolymer, thereby yielding a gyroidal mesoporous carbon comprising a monolithic ordered gyroidal triblock terpolymer-directed structure and mesopores having a pore size of greater than 11 nanometers (nm) in diameter.

14. The method according to claim 13 further comprising:
    prior to the treating step, inducing crosslinking of the carbon precursor contained in the molded component.

15. The method according to claim 13, wherein the combining and treating steps comprise a solvent evaporation induced self-assembly (EISA) process.

16. The method according to claim 15, wherein the EISA process comprises:
    dissolving the triblock terpolymer and the carbon precursor in a solvent to yield a triblock terpolymer/carbon precursor mixture;
    casting the mixture in a mold to yield a terpolymer/carbon precursor molded component having a desired form;
    evaporating the solvent from the triblock terpolymer/carbon precursor molded component;
    optionally inducing crosslinking of the carbon precursor contained in the molded component; and
    pyrolyzing the molded component to remove the triblock terpolymer, thereby yielding the gyroidal mesoporous carbon.

17. The method according to claim 16, wherein the solvent is selected from the group consisting of organic solvents, polar organic solvents, protic organic solvents, and mixtures thereof.

18. The method according to claim 13, wherein the triblock terpolymer is poly(isoprene)-b-poly(styrene)-b-poly(ethylene oxide) (ISO).

19. The method according to claim 13, wherein the triblock terpolymer is selected from the group consisting of the following:
    poly(isoprene)-block-poly(styrene)-block-poly(ethylene oxide),
    poly(isoprene)-block-poly(styrene)-block-poly(4-vinyl pyridine),
    poly(isoprene)-block-poly(styrene)-block-poly(2-vinyl pyridine),
    poly(isoprene)-block-poly(styrene)-block-poly(glycidyl methacrylate),
    poly(isoprene)-block-poly(styrene)-block-poly(dimethyl amino ethyl methacrylate),
    poly(isoprene)-block-poly(styrene)-block-poly(methacrylic acid),
    poly(butadiene)-block-poly(styrene)-block-poly(ethylene oxide),
    poly(butadiene)-block-poly(styrene)-block-poly(4-vinyl pyridine),
    poly(butadiene)-block-poly(styrene)-block-poly(2-vinyl pyridine),
    poly(butadiene)-block-poly(styrene)-block-poly(glycidyl methacrylate),
    poly(butadiene)-block-poly(styrene)-block-poly(dimethyl amino ethyl methacrylate),
    poly(butadiene)-block-poly(styrene)-block-poly(methacrylic acid),
    poly(isoprene)-block-poly(styrene)-block-Polymer X,
    poly(isoprene)-block-poly(styrene)-block-Polymer X,
    poly(isoprene)-block-poly(styrene)-block-Polymer X,
    poly(isoprene)-block-poly(styrene)-block-Polymer X,
    poly(isoprene)-block-poly(styrene)-block-Polymer X,
    poly(isoprene)-block-poly(styrene)-block-Polymer X,
    poly(butadiene)-block-poly(styrene)-block-Polymer X,
    poly(butadiene)-block-poly(styrene)-block-Polymer X,
    poly(butadiene)-block-poly(styrene)-block-Polymer X,
    poly(butadiene)-block-poly(styrene)-block-Polymer X,
    poly(butadiene)-block-poly(styrene)-block-Polymer X, and
    poly(butadiene)-block-poly(styrene)-block-Polymer X,
    wherein Polymer X comprises a hydrophilic third block polymer.

20. The method according to claim 13, wherein the carbon precursor comprises a hydrophilic molecule that forms hydrogen bonds with a hydrophilic block of the triblock terpolymer.

21. The method according to claim 20, wherein the hydrophilic block of the triblock terpolymer is poly(ethylene oxide).

22. The method according to claim 13, wherein the carbon precursor comprises a thermally cross-linkable organic molecule selected from the group consisting of resins, oligomeric resins, aromatic alcohols, unsaturated alcohols, phenol based resols, phenol-formaldehyde resols, resorcinol-formaldehyde resols, furfuryl alcohol, and mixtures thereof.

23. The method according to claim 13, wherein the triblock terpolymer is poly(isoprene)-b-poly(styrene)-b-poly(ethylene oxide) (ISO) and the carbon precursor is a phenol-formaldehyde resol.

24. The method according to claim 13, wherein the molecular mass (g/mol) ratio of the triblock terpolymer to the carbon precursor is greater than or equal to 200:1 or less than or equal to 3,000:1.

25. The method according to claim 13 further comprising:
    subjecting the gyroidal mesoporous carbon to an activation process to form nanopores on and/or within the gyroidal mesoporous carbon to increase surface area thereof.

26. The method according to claim 25, wherein the activation process is selected from the group consisting of a carbon dioxide activation process and a heat-treatment activation process.

27. The method according to claim 13 further comprising:
    adding a dopant and/or a nanoparticulate precursor during the combining step.

28. A mesoporous carbon composition comprising a carbonized gyroidal mesoporous carbon comprising a monolithic ordered gyroidal triblock terpolymer-directed structure and mesopores having a pore size of greater than 11 nanometers (nm) in diameter, wherein long range order of the ordered gyroidal triblock terpolymer-directed structure is thermally stable at least at temperatures up to 1600° C., and wherein said mesoporous carbon composition is produced by a method comprising the steps of:

combining a carbon precursor and a structure-directing triblock terpolymer to yield a self-assembled precursor/terpolymer composite having an ordered gyroidal structure that is defined by the triblock terpolymer and the ratio of the triblock terpolymer to the carbon precursor; and treating the precursor/terpolymer composite to remove the triblock terpolymer, thereby yielding a gyroidal mesoporous carbon comprising a monolithic ordered gyroidal triblock terpolymer-directed structure and mesopores having a pore size of greater than 11 nanometers (nm) in diameter.

29. An electrode material comprising the mesoporous carbon composition according to claim 28.

30. A fuel cell, battery, supercapacitor, capacitive desalination membranes, energy storage device, or energy conversion devices comprising the electrode material according to claim 29.

31. The composition according to claim 1, wherein the ordered gyroidal structure comprises a single gyroidal mesoporous carbon morphology.

32. The composition according to claim 1, wherein the long range order is evidenced by at least six clearly identifiable small-angle X-ray scattering (SAXS) peaks at 1600° C.

33. A mesoporous carbon composition comprising:

a carbonized gyroidal mesoporous carbon comprising a monolithic ordered structure and mesopores having a pore size of greater than 11 nanometers (nm) in diameter, wherein the ordered gyroidal structure comprises a single gyroidal mesoporous carbon morphology.

* * * * *